(12) United States Patent
Tashiro

(10) Patent No.: US 8,482,861 B2
(45) Date of Patent: Jul. 9, 2013

(54) ZOOM LENS AND IMAGE PICKUP APPARATUS EQUIPPED WITH ZOOM LENS

(75) Inventor: Yoshihisa Tashiro, Nikko (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 13/176,899

(22) Filed: Jul. 6, 2011

(65) Prior Publication Data
US 2012/0013994 A1    Jan. 19, 2012

(30) Foreign Application Priority Data
Jul. 14, 2010   (JP) ................................ 2010-159295

(51) Int. Cl.
*G02B 15/14*   (2006.01)
(52) U.S. Cl.
USPC .......................................... 359/682; 359/686
(58) Field of Classification Search
USPC ................... 359/676, 680–682, 686
See application file for complete search history.

(56) References Cited

U.S. PATENT DOCUMENTS

| | | | |
|---|---|---|---|
| 7,777,967 B2 | 8/2010 | Hirakawa | |
| 2010/0172030 A1* | 7/2010 | Yamano | 359/686 |
| 2011/0157715 A1* | 6/2011 | Ito | 359/682 |

FOREIGN PATENT DOCUMENTS

| | | | |
|---|---|---|---|
| CN | 101017237 A | 8/2007 | |
| CN | 101726842 A | 6/2010 | |
| JP | 2003-131130 A | 5/2003 | |

* cited by examiner

*Primary Examiner* — Darryl J Collins
(74) *Attorney, Agent, or Firm* — Canon U.S.A., Inc. IP Division

(57) ABSTRACT

A zoom lens includes, in order from an object side to an image side, a first lens unit having a negative refractive power, a second lens unit having a positive refractive power, a third lens unit having a negative refractive power, and a fourth lens unit having a positive refractive power. A distance between consecutive lens units of the first through fourth lens units varies for zooming. The first lens unit includes, in order from the object side to the image side, a negative lens and a positive lens whose surface on the object side has a convex shape. In the zoom lens, a focal length f1, a focal length f3, an Abbe number υd1$p$, a focal length f3$i$, and an Abbe number υd3$i$ are appropriately set.

9 Claims, 25 Drawing Sheets

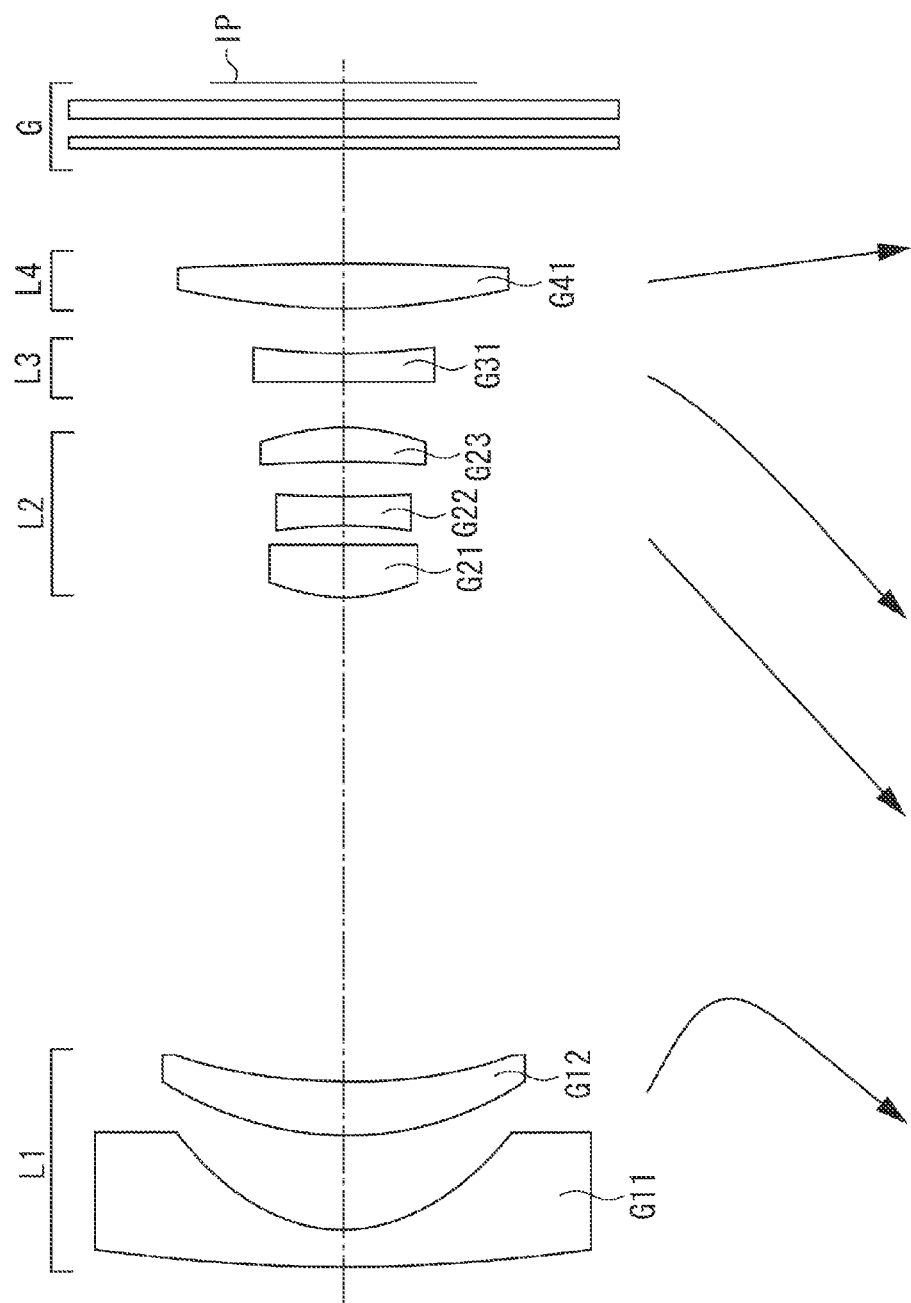

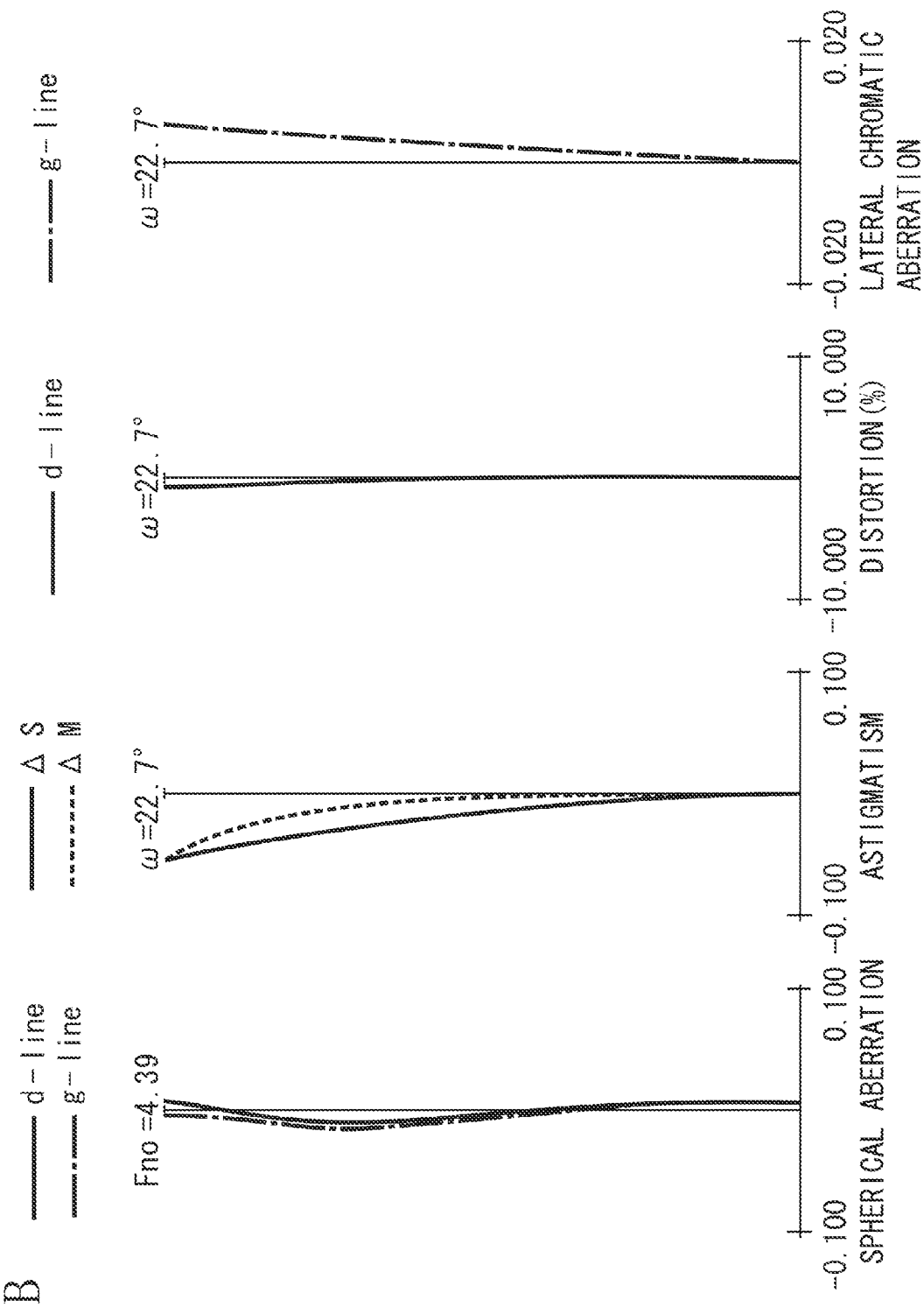

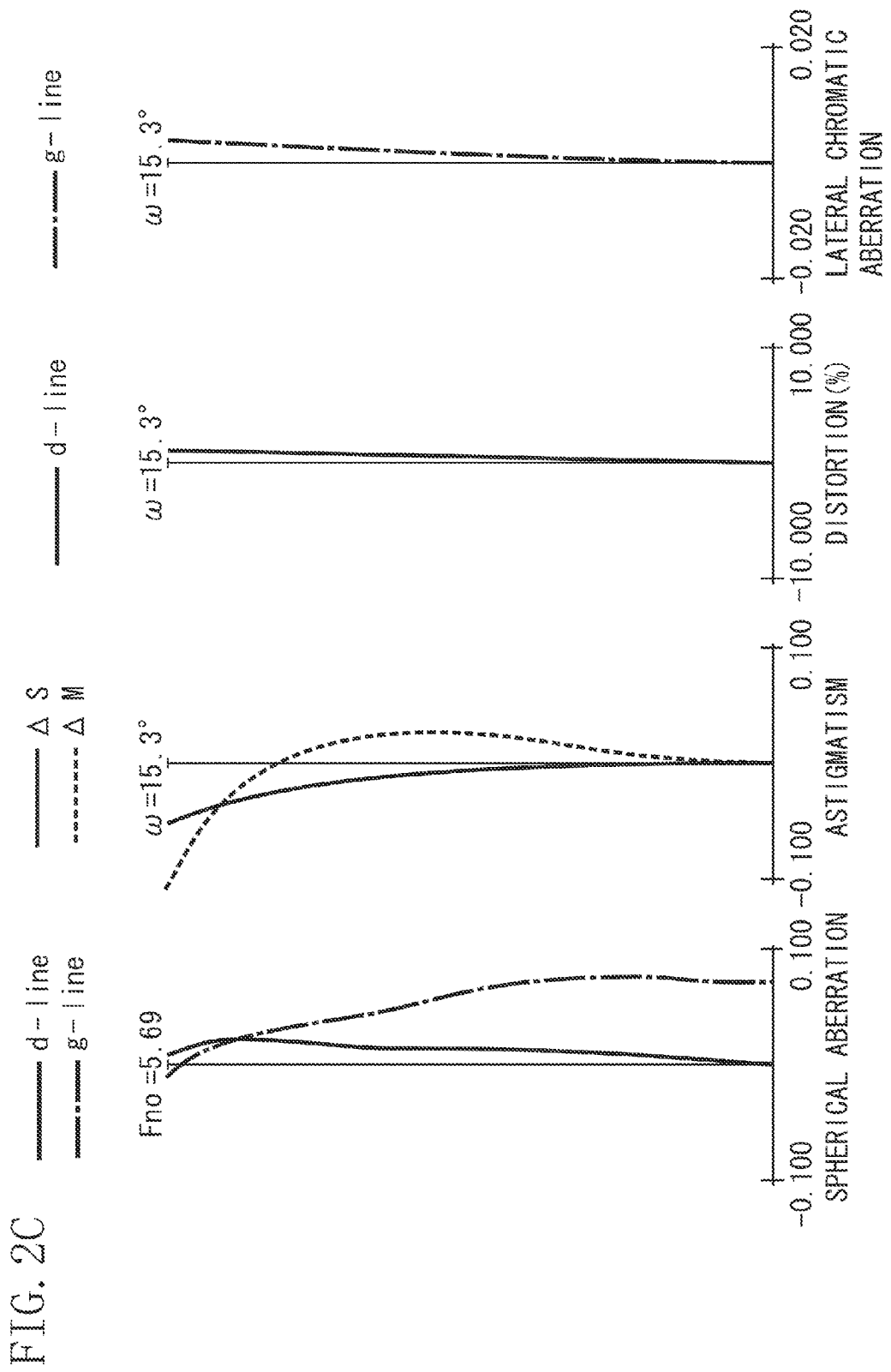

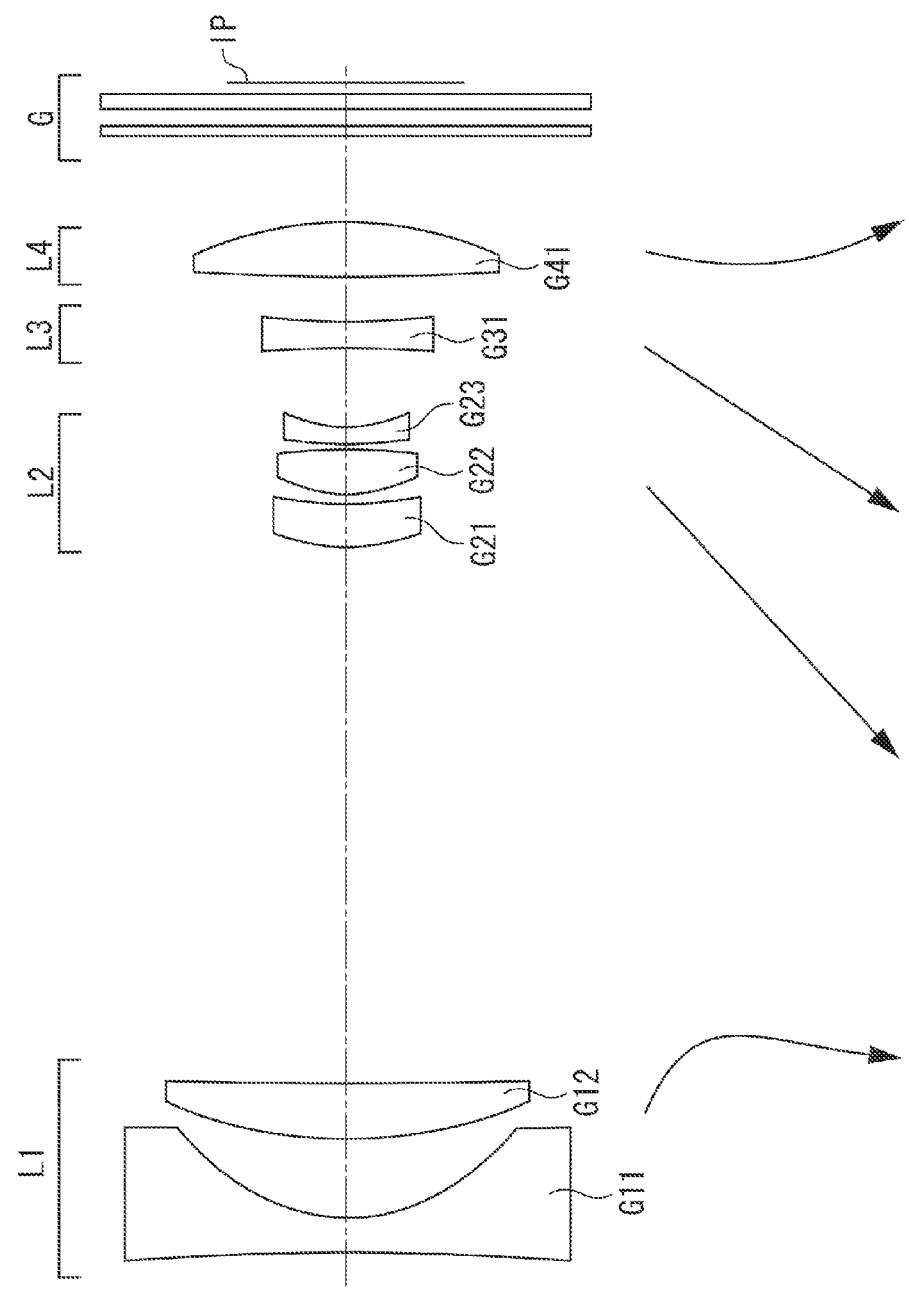

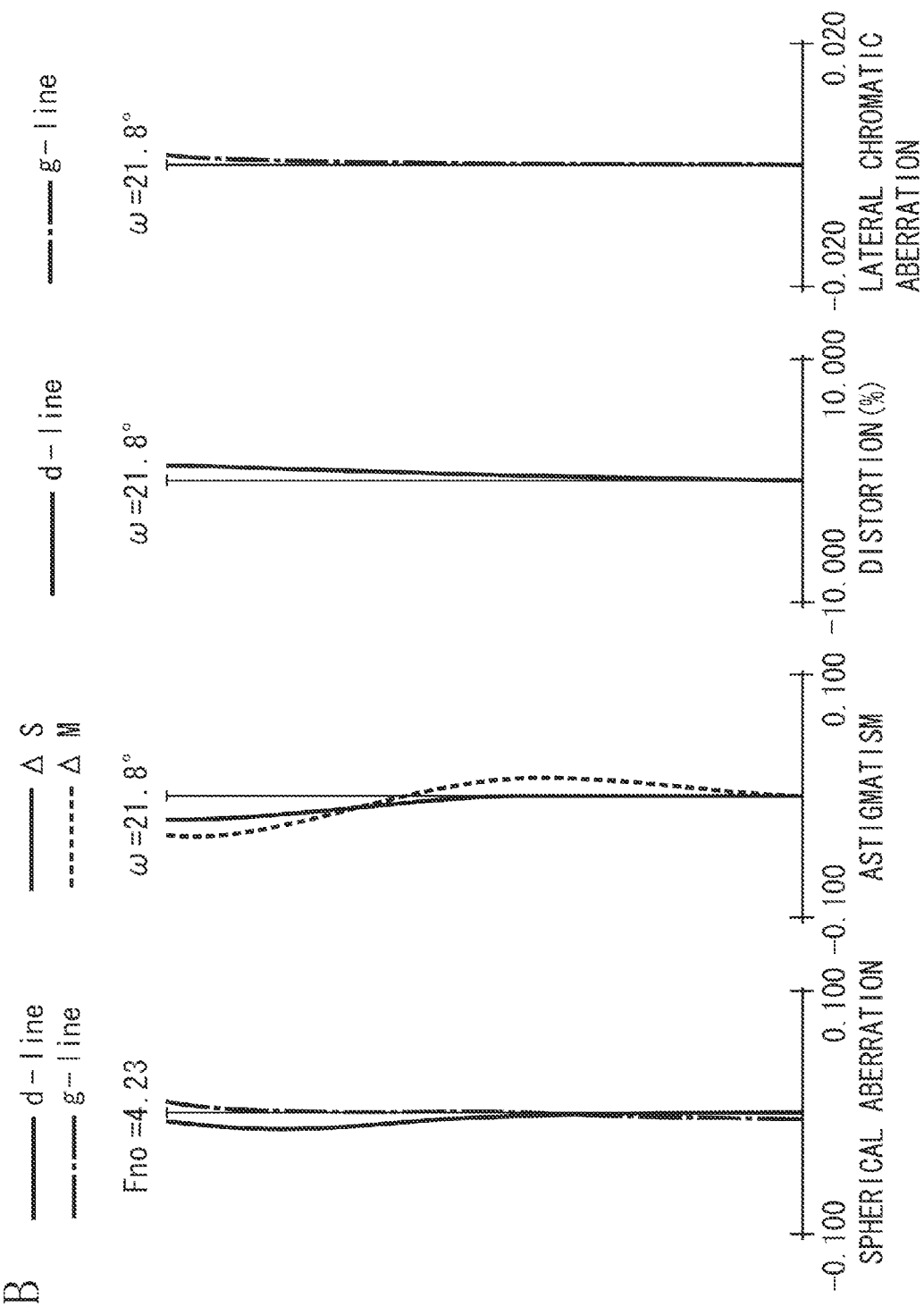

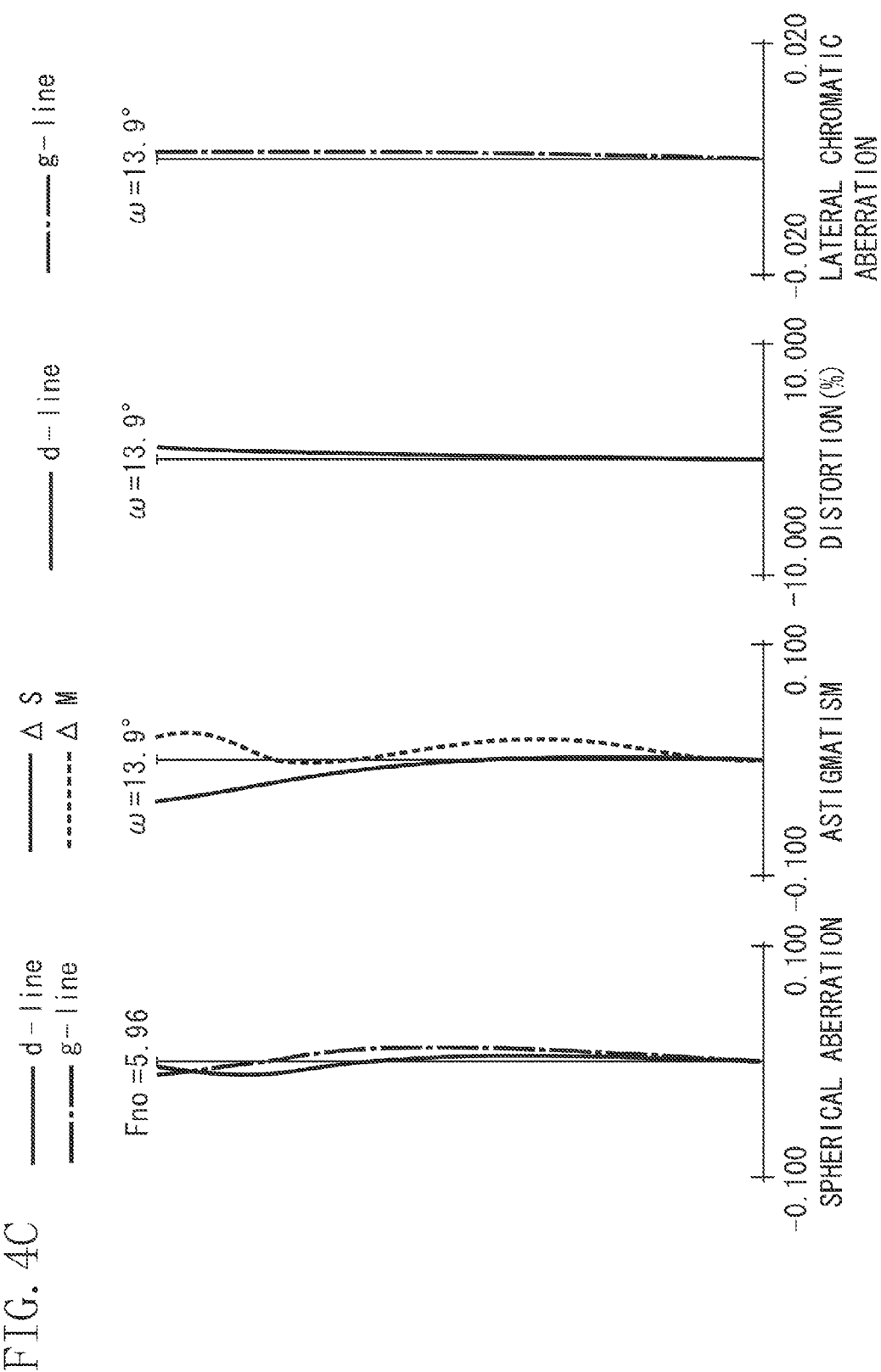

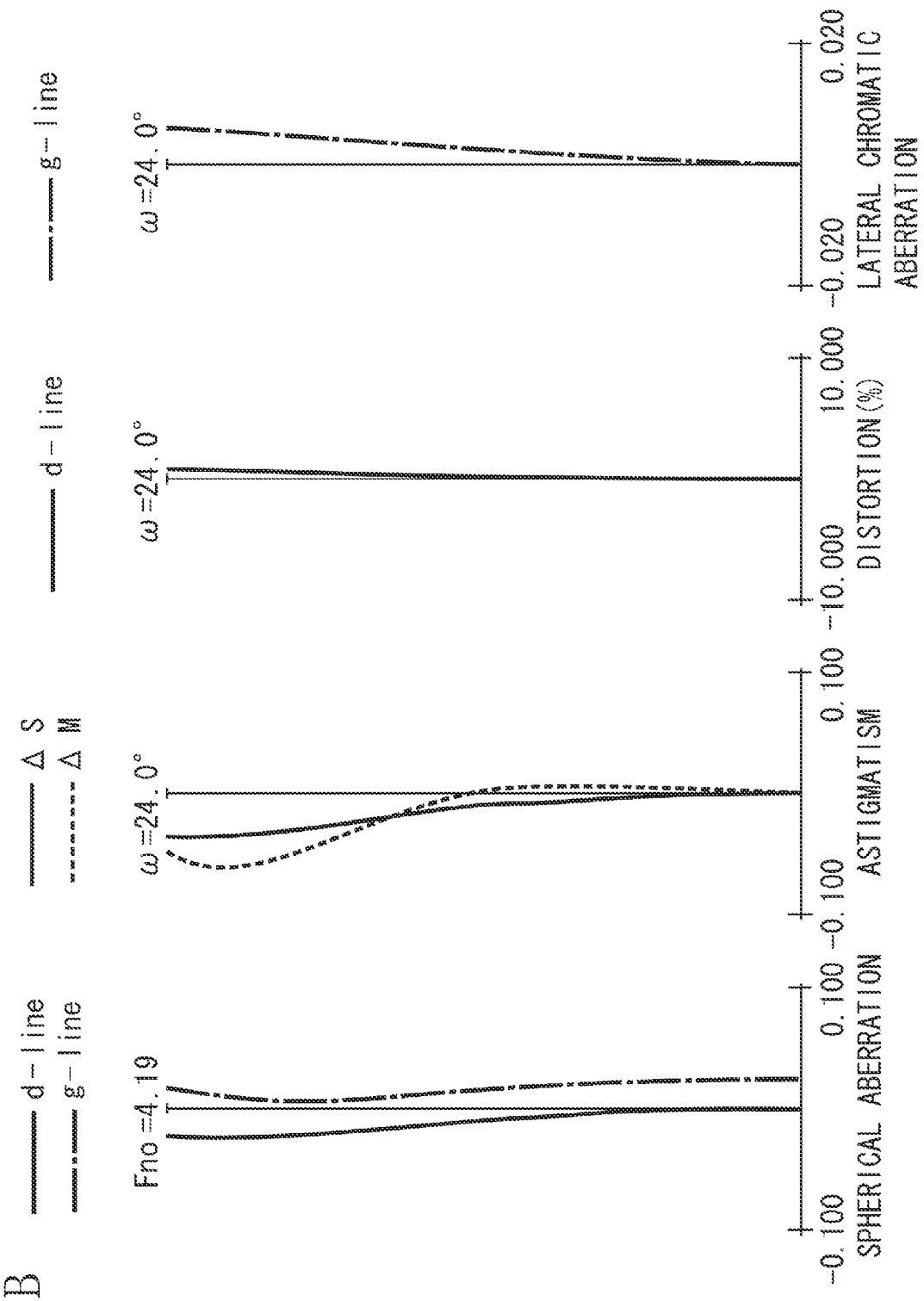

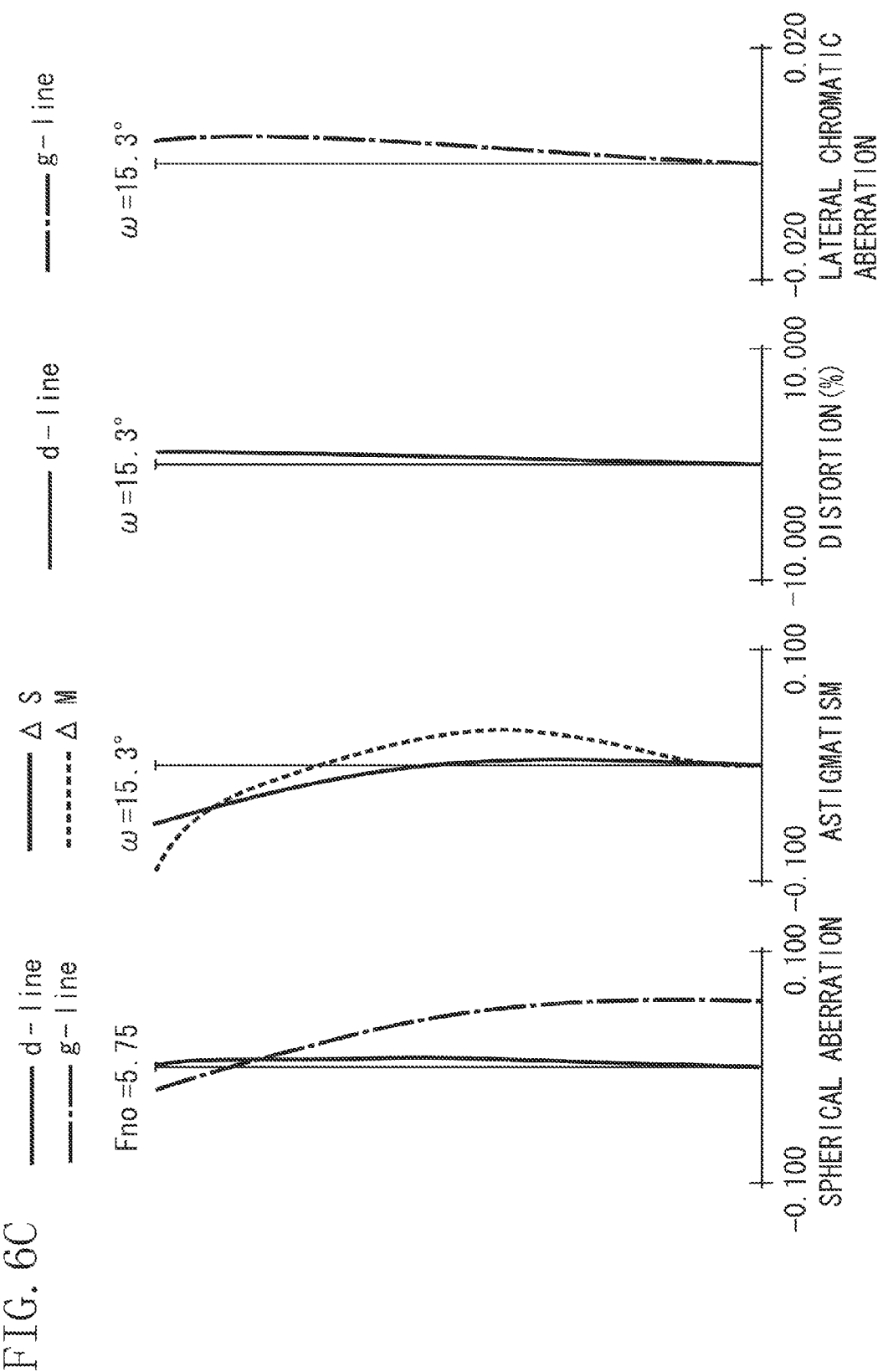

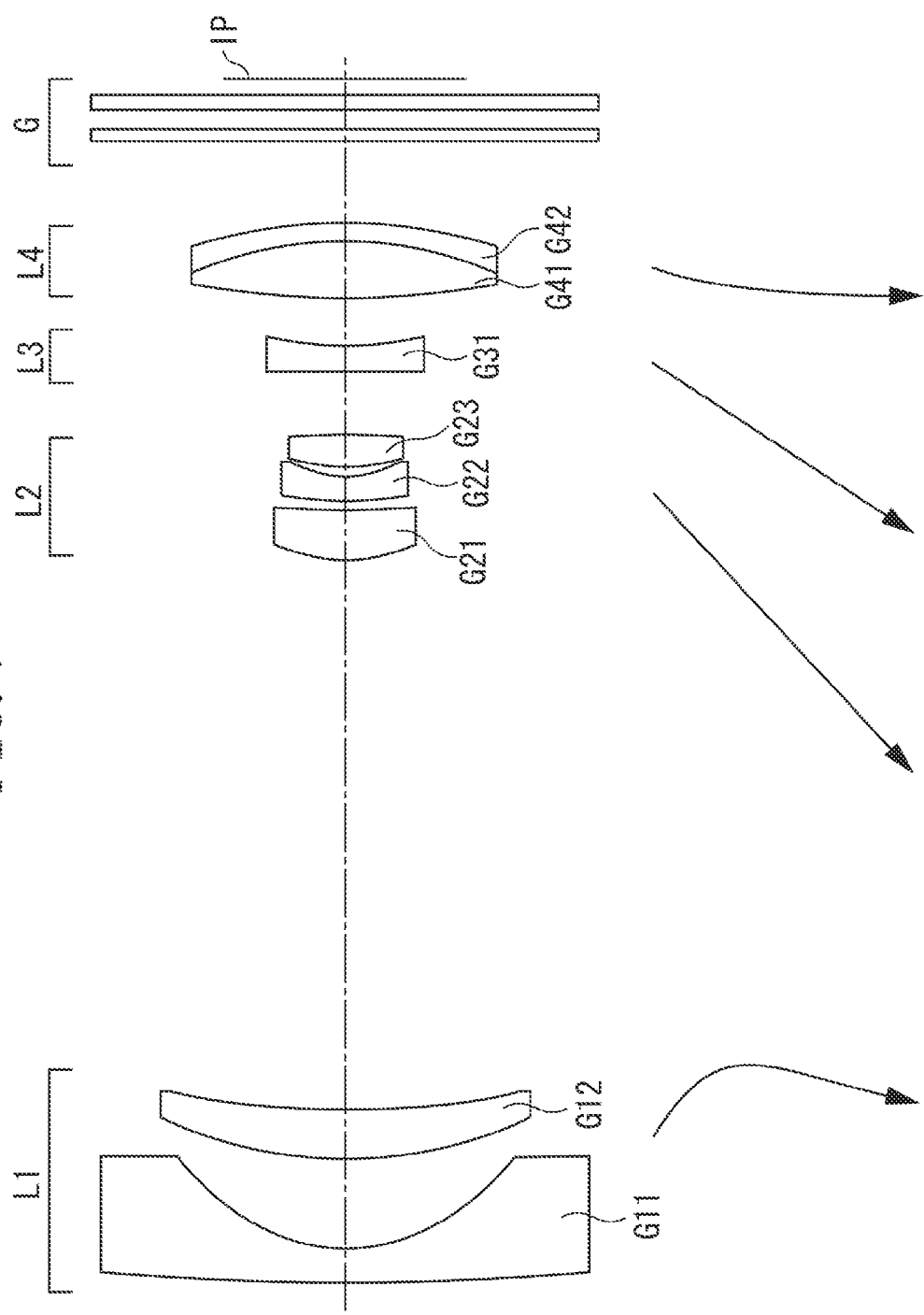

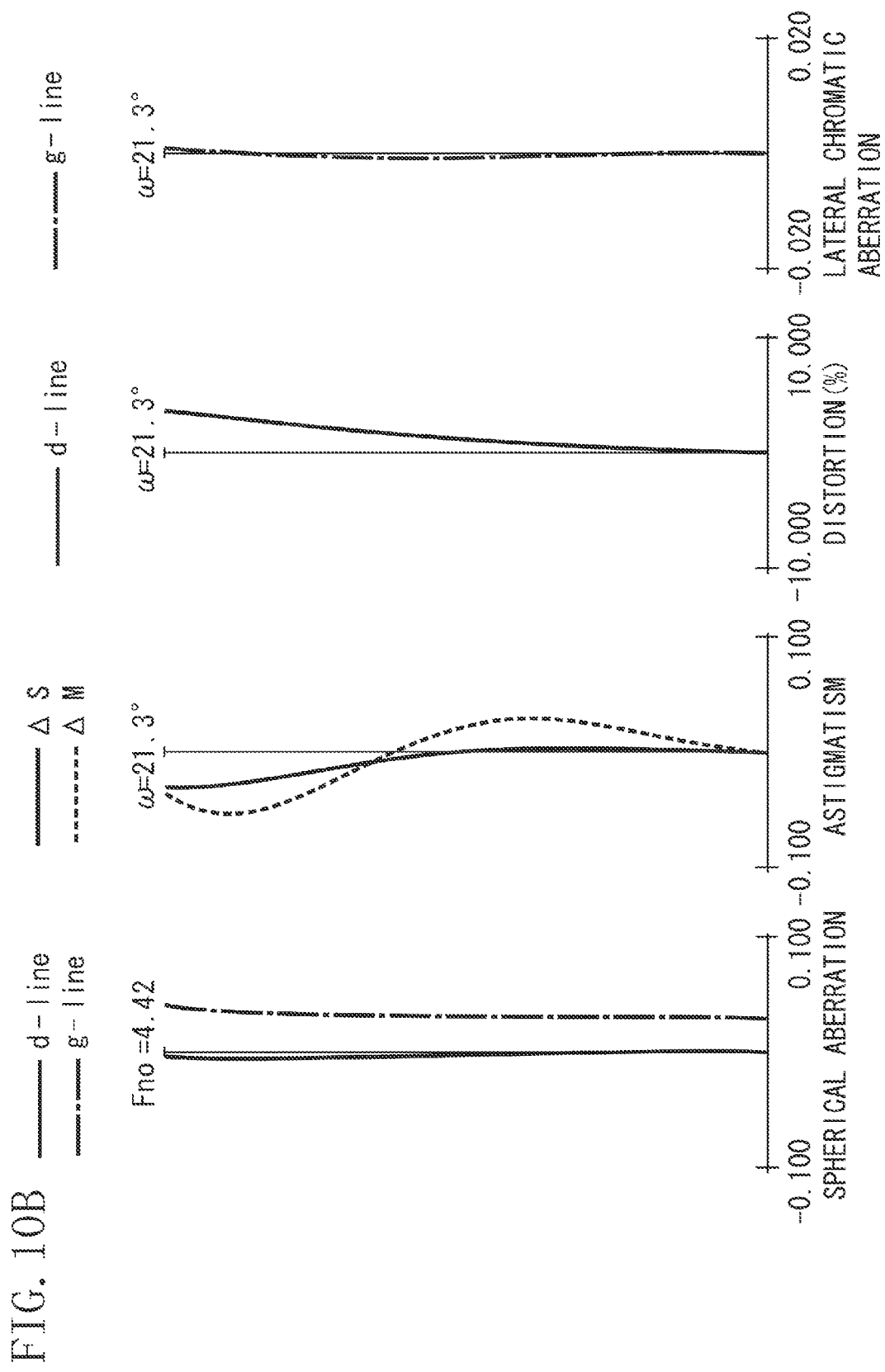

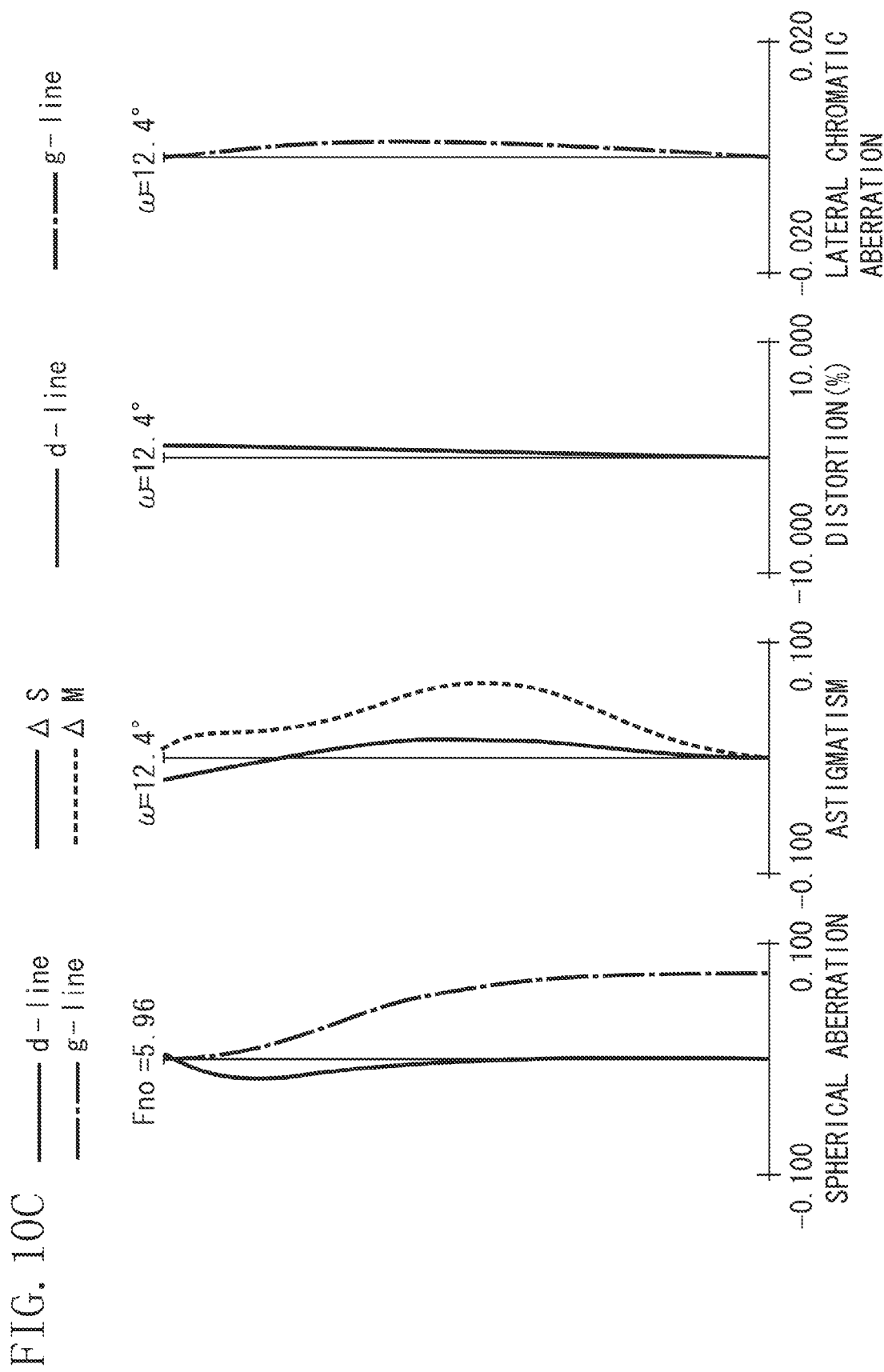

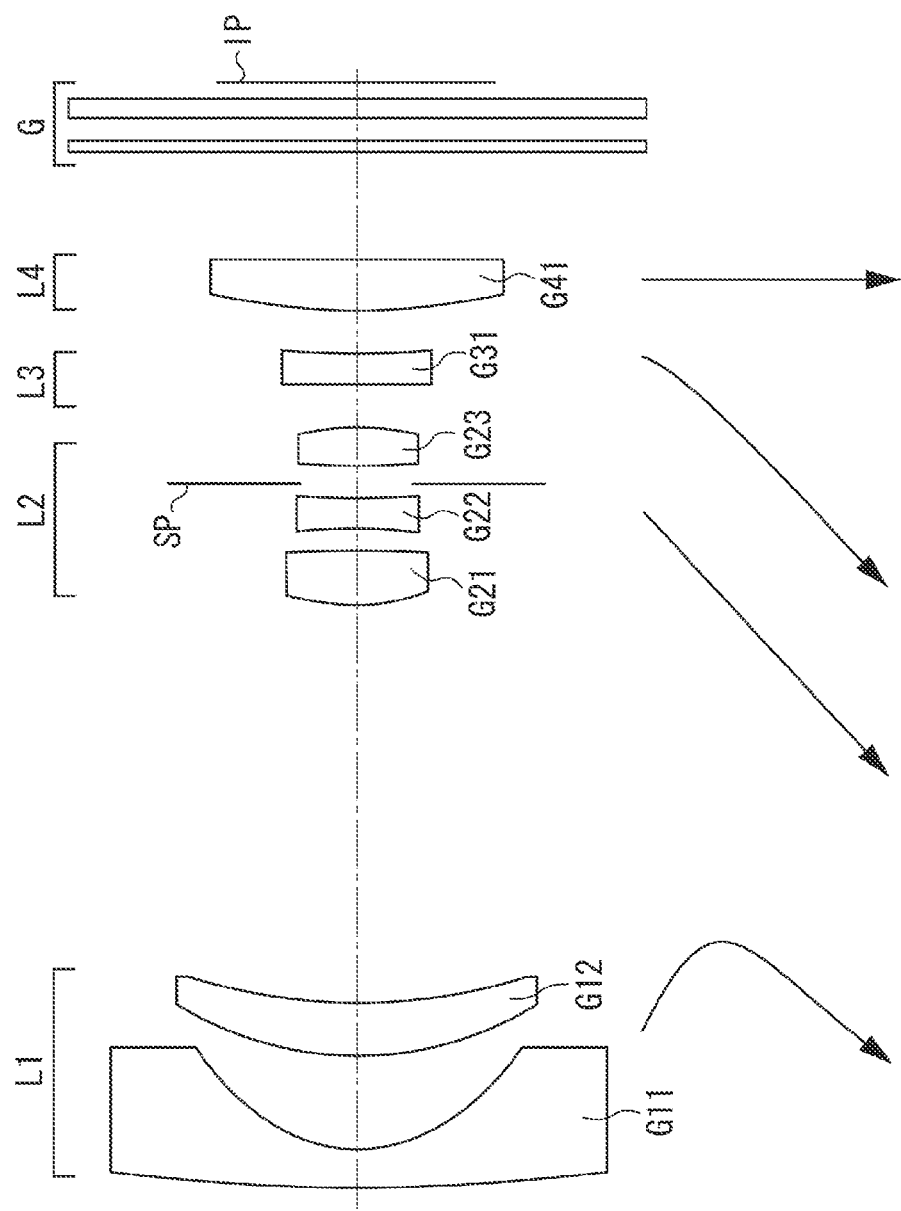

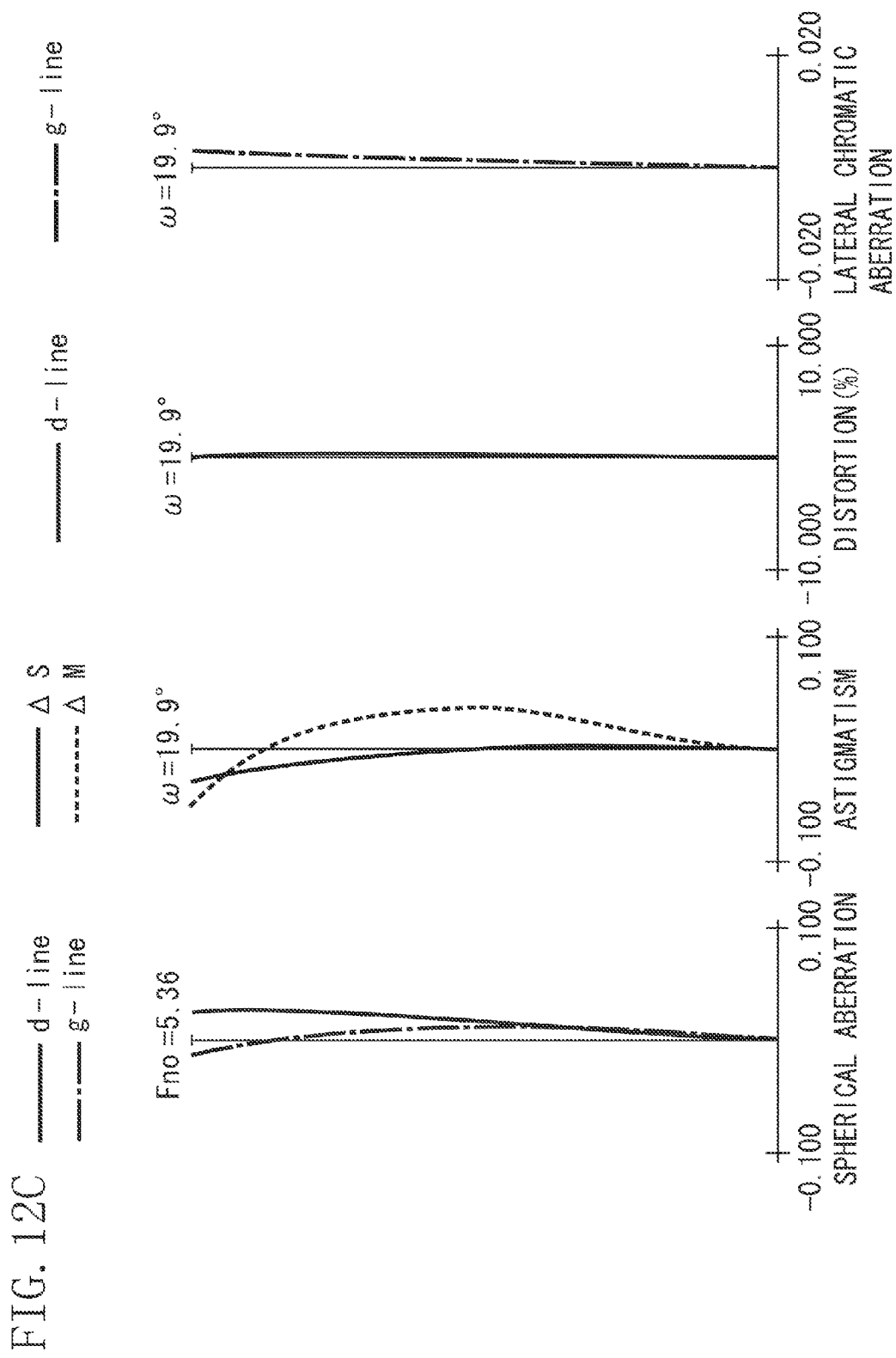

ZOOM LENS AND IMAGE PICKUP APPARATUS EQUIPPED WITH ZOOM LENS

BACKGROUND OF THE INVENTION

1. Field of the Invention

The present invention relates to a zoom lens and an image pickup apparatus having the zoom lens. In particular, the present invention relates to a zoom lens useful for an image pickup apparatus, such as a digital camera, a video camera, a monitoring camera, a silver-halide film camera, or a television (TV) camera.

2. Related Background Art

As a zoom lens whose total size is small and which is capable of easily increasing the angle of view, a negative lead type zoom lens has been used. A negative lead type zoom lens typically includes a lens unit (lens group) having a negative refractive power located on the object side (front) of the zoom lens. In a known configuration of a negative lead type zoom lens, a four-unit zoom lens has been used. The four-unit zoom lens of the negative type is generally constituted by, in order from the object side to the image side, a lens unit having a negative refractive power, a lens unit having a positive refractive power, a lens unit having a negative refractive power, and a lens unit having a positive refractive power. In operation, the four-unit zoom lens is configured to execute variation of magnification (zooming) by mechanically changing the distances between the lens units.

In order to accommodate recently-developed image sensors that include a large number of pixels per unit area, new image pickup apparatuses, such as still image and video recording cameras, require a zoom lens having a small total size and high optical performance. In addition to that, it is also desirable a zoom lens having a wide angle of view in order to achieve a large imaging region.

In the field of negative lead type zoom lenses, U.S. Pat. No. 7,777,967 discusses a four-unit zoom lens, which has a zoom ratio as high as 5 times and a wide angle of view of an imaging half angle of view of about 40° at the wide-angle end. Japanese Patent Application Laid-Open No. 2003-131130 discusses a small-size four-unit zoom lens, which has a zoom ratio of about 3 times and an imaging half angle of view of about 35° at the wide-angle end and whose first lens unit is constituted by two lenses.

In general, a negative lead type zoom lens is useful in achieving a wide angle of view, but has a remarkably asymmetric lens configuration. Accordingly, in a four-unit zoom lens in which each lens unit moves during zooming, variation of aberration may increase. Therefore, it becomes extremely difficult to achieve a high optical performance for the entire zoom range while achieving a small total size of the zoom lens.

In particular, if the angle of view is increased in a four-unit zoom lens, curvature of field and chromatic aberration may increase. In the zoom lens discussed in U.S. Pat. No. 7,777,967, the first lens unit is constituted by two negative lenses and one positive lens. With this configuration, the zoom lens discussed in U.S. Pat. No. 7,777,967 corrects curvature of field and chromatic aberration of magnification (lateral chromatic aberration). However, because the first lens unit includes three lenses, the thickness of the first lens unit may increase. As a result, the thickness of the zoom lens when the lens barrel is retracted may increase in the direction of the optical axis.

In the zoom lens discussed in Japanese Patent Application Laid-Open No. 2003-131130, the first lens unit is constituted by one negative lens and one positive lens. With this configuration, the zoom lens discussed in Japanese Patent Application Laid-Open No. 2003-131130 reduces the thickness of the zoom lens in the direction of the optical axis when the lens barrel is retracted. However, the zoom lens discussed in Japanese Patent Application Laid-Open No. 2003-131130 does not have a sufficiently wide imaging angle of view due to the imaging half angle of view at the wide-angle end as low as 35°.

In the above-described four-unit zoom lens, it is significant, in order to achieve a zoom lens whose total size is small, which has a wide angle of view, and which has a high optical performance for the entire zoom range, to appropriately set the refractive power (power) of each lens unit, the lens configuration, and an Abbe number (dispersion) of a material used for a lens constituting each lens unit. More specifically, unless the refractive power of the first lens unit having a negative refractive power and the third lens unit having a negative refractive power and the material of lenses included in the first and the third lens units are appropriately set, it becomes difficult to achieve a zoom lens having a wide angle of view and a high optical performance for the entire zoom range.

SUMMARY OF THE INVENTION

In accordance with the various embodiments disclosed herein, the present invention is directed to a zoom lens capable of effectively correcting various aberrations, such as curvature of field or chromatic aberration and achieving high optical performance for the entire zoom range while maintaining a wide angle of view during magnification variation, and a short total length when the lens is retracted.

According to an aspect of the present invention, a zoom lens includes, in order from an object side to an image side, a first lens unit having a negative refractive power, a second lens unit having a positive refractive power, a third lens unit having a negative refractive power, and a fourth lens unit having a positive refractive power. In the zoom lens, an interval between adjacent ones of the first through fourth lens units varies for zooming. In the zoom lens, the first lens unit includes, in order from the object side to the image side, a negative lens and a positive lens whose surface on the object side thereof has a convex shape. When f1 is a focal length of the first lens unit, f3 is a focal length of the third lens unit, $\nu d1p$ is an Abbe number of a material of the positive lens of the first lens unit, $f3i$ is a focal length in air of an i-th single lens counted from the object side included in the third lens unit, $\nu d3i$ is an Abbe number of the material of the i-th single lens counted from the object side included in the third lens unit, and $\Sigma$ is a sum with respect to the focal lengths $f3i$ and the Abbe numbers $\nu d3i$ of all single lenses included in the third lens unit, the following conditions are satisfied:

$$0.30 < f1/f3 < 0.68$$

$$10.0 < \nu d1p < 23.0$$

$$2.1 < f3 \times \Sigma(100/(f3i \times \nu d3i)) < 5.0.$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 1 is a cross section of a zoom lens according to a first exemplary embodiment of the present invention at the wide-angle end.

FIGS. 2A, 2B and 2C are aberration charts of the zoom lens at the wide-angle end, at a middle focal length, and at a telephoto end, respectively, according to the first exemplary embodiment.

FIG. 3 is a cross section of a zoom lens according to a second exemplary embodiment of the present invention at the wide-angle end.

FIGS. 4A, 4B and 4C are aberration charts of the zoom lens at the wide-angle end, at a middle focal length, and at the telephoto end, respectively, according to the second exemplary embodiment.

FIGS. 6A, 6B and 6C are aberration charts of the zoom lens at the wide-angle end, at a middle focal length, and at the telephoto end, respectively, according to the third exemplary embodiment.

FIG. 7 is a cross section of a zoom lens according to a fourth exemplary embodiment of the present invention at the wide-angle end.

FIGS. 10A, 10B and 10C are aberration charts of the zoom lens at the wide-angle end, at a middle focal length, and at the telephoto end, respectively, according to the fifth exemplary embodiment.

FIG. 11 is a cross section of a zoom lens according to a sixth exemplary embodiment of the present invention at the wide-angle end.

FIGS. 12A, 12B and 12C are aberration charts of the zoom lens at the wide-angle end, at a middle focal length, and at the telephoto end, respectively, according to the sixth exemplary embodiment.

DESCRIPTION OF THE EMBODIMENTS

Various exemplary embodiments, features, and aspects of the invention will be described in detail below with reference to the drawings.

A zoom lens according to an exemplary embodiment of the present invention includes, in order from the object side to the image side, a first lens unit having a negative refractive power, a second lens unit having a positive refractive power, a third lens unit having a negative refractive power, and a fourth lens unit having a positive refractive power. Zooming is executed by moving each lens unit to change the intervals among the lens units.

During zooming from the wide-angle end to the telephoto end, the first lens unit moves along a path of a locus convex towards the image side. The second lens unit and the third lens unit move towards the object side independently from each other. The fourth lens unit moves towards the image side or towards the object side or moves along a locus convex towards the object side. As used herein, the term "lens unit" refers to a lens group that contains one or more lenses. That is, even though certain lens unit may contain only one lens, the single lens is still referred to as a "lens unit" for ease of explanation.

Figure 2A:
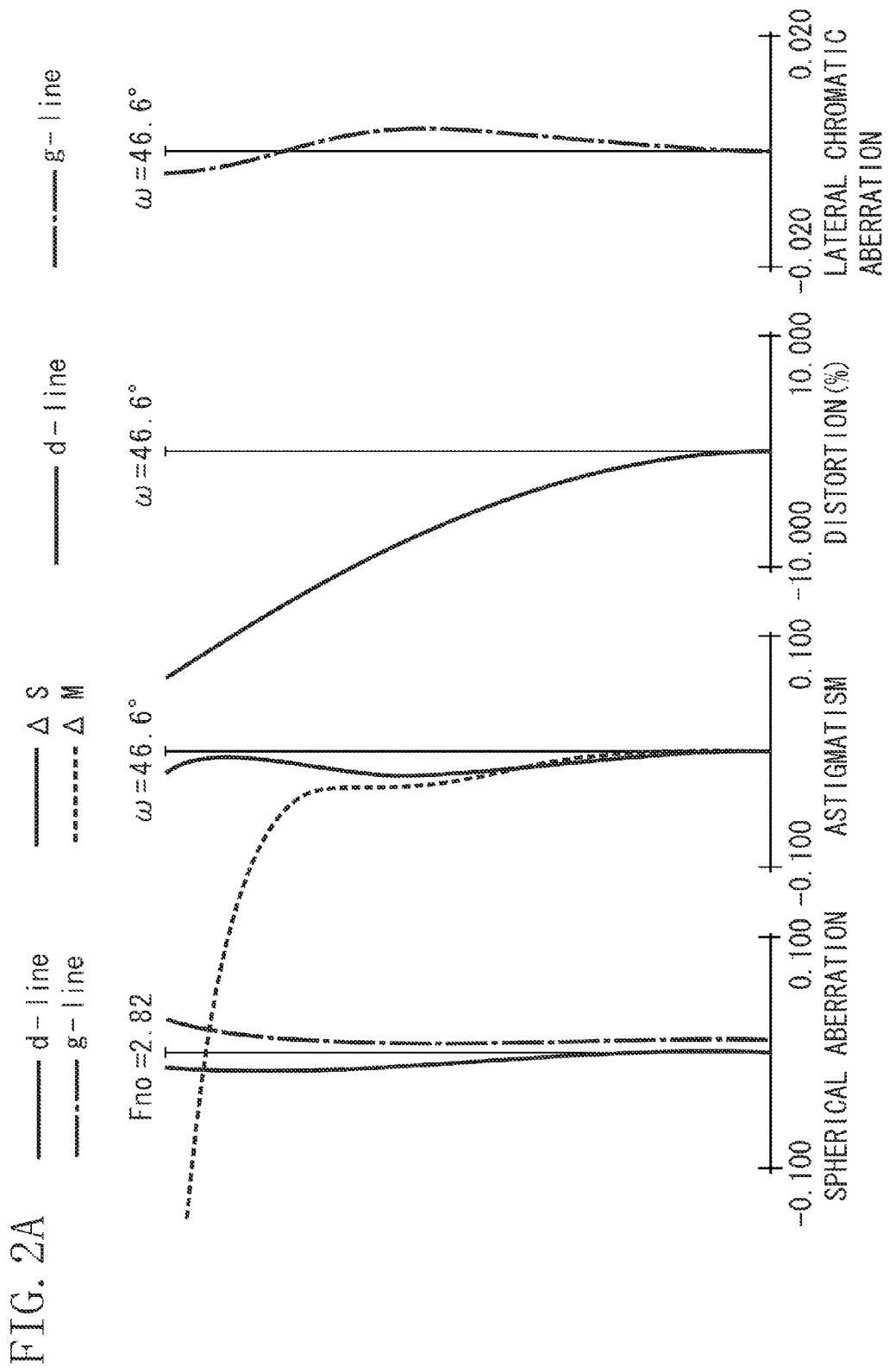

FIG. 1 is a cross section of the zoom lens according to the first exemplary embodiment at the wide-angle end (short focal length end). FIGS. 2A through 2C are aberration charts of the zoom lens at the wide-angle end, at a middle focal length, and at the telephoto end (long focal length end), respectively, according to the first exemplary embodiment. The first exemplary embodiment is a zoom lens having a zoom ratio of 3.87 and an aperture ratio (F-number) of 2.82 to 5.96.

Figure 4A:
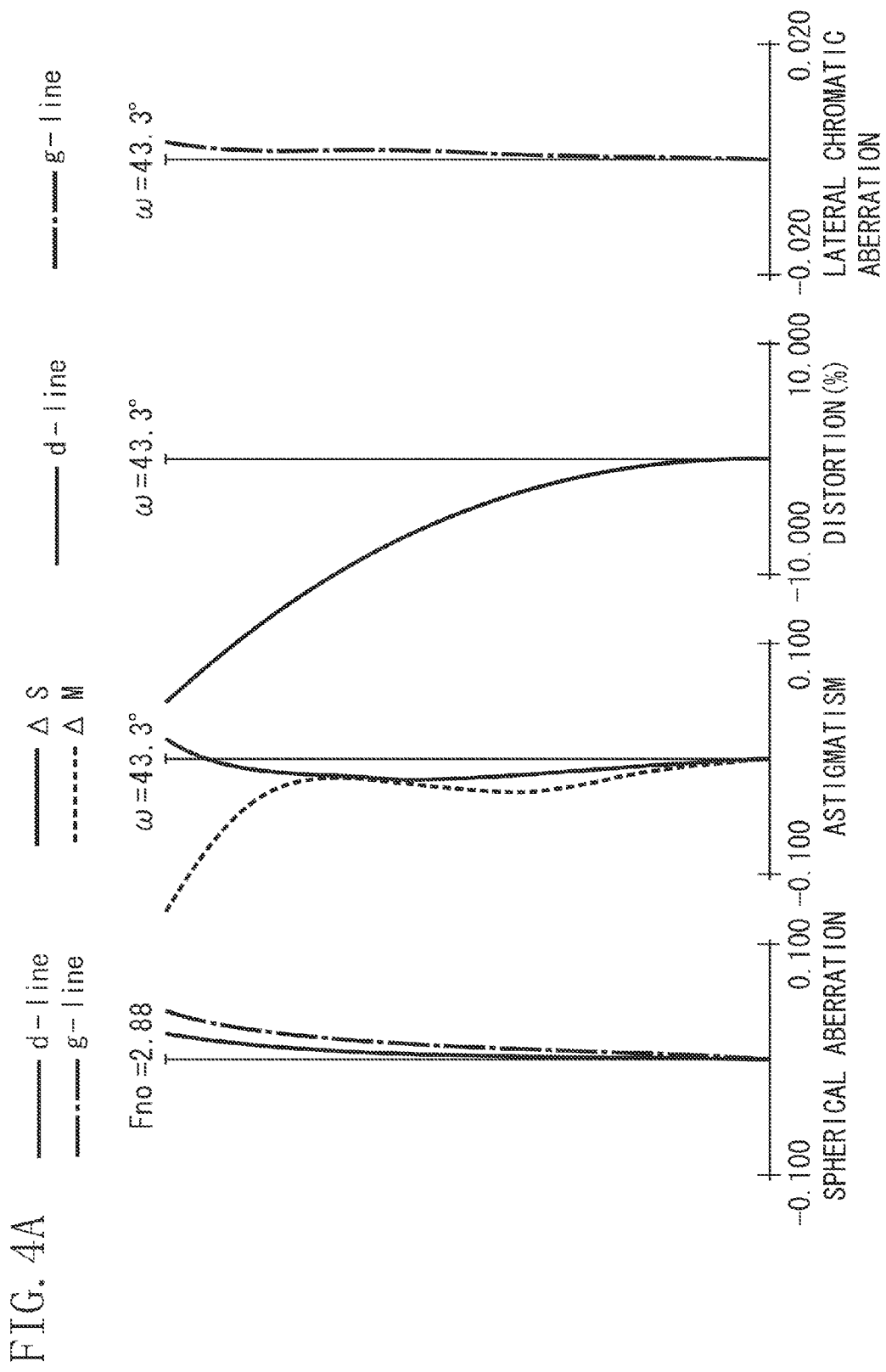

FIG. 3 is a cross section of a zoom lens according to a second exemplary embodiment of the present invention at the wide-angle end. FIGS. 4A through 4C are aberration charts of the zoom lens at the wide-angle end, at a middle focal length, and at the telephoto end, respectively, according to the second exemplary embodiment. The second exemplary embodiment is a zoom lens of a zoom ratio of 3.81 and an aperture ratio of 2.88 to 5.96.

Figure 5:
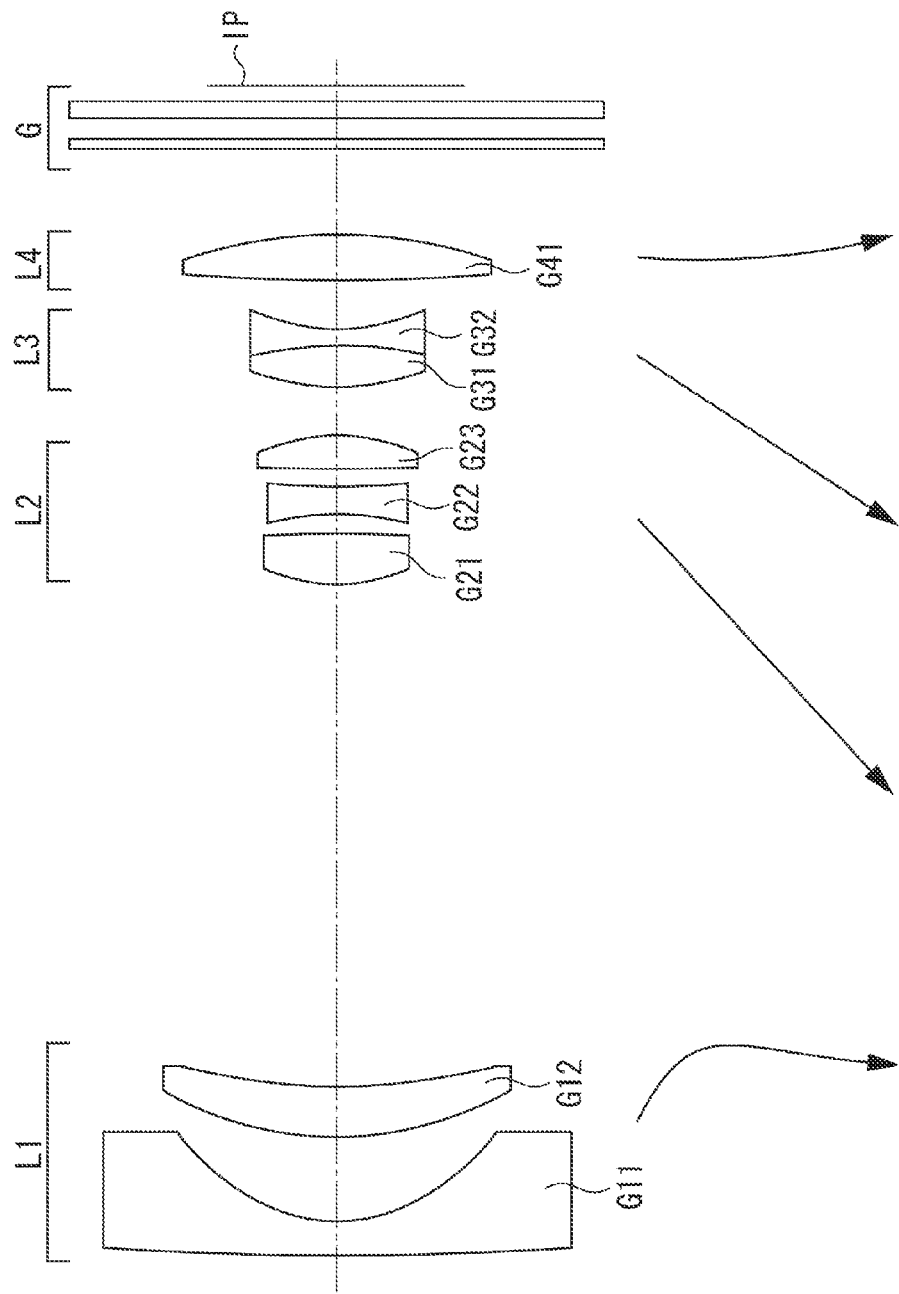
FIG. 5 is a cross section of a zoom lens according to a third exemplary embodiment of the present invention at the wide-angle end.
Figure 6A:
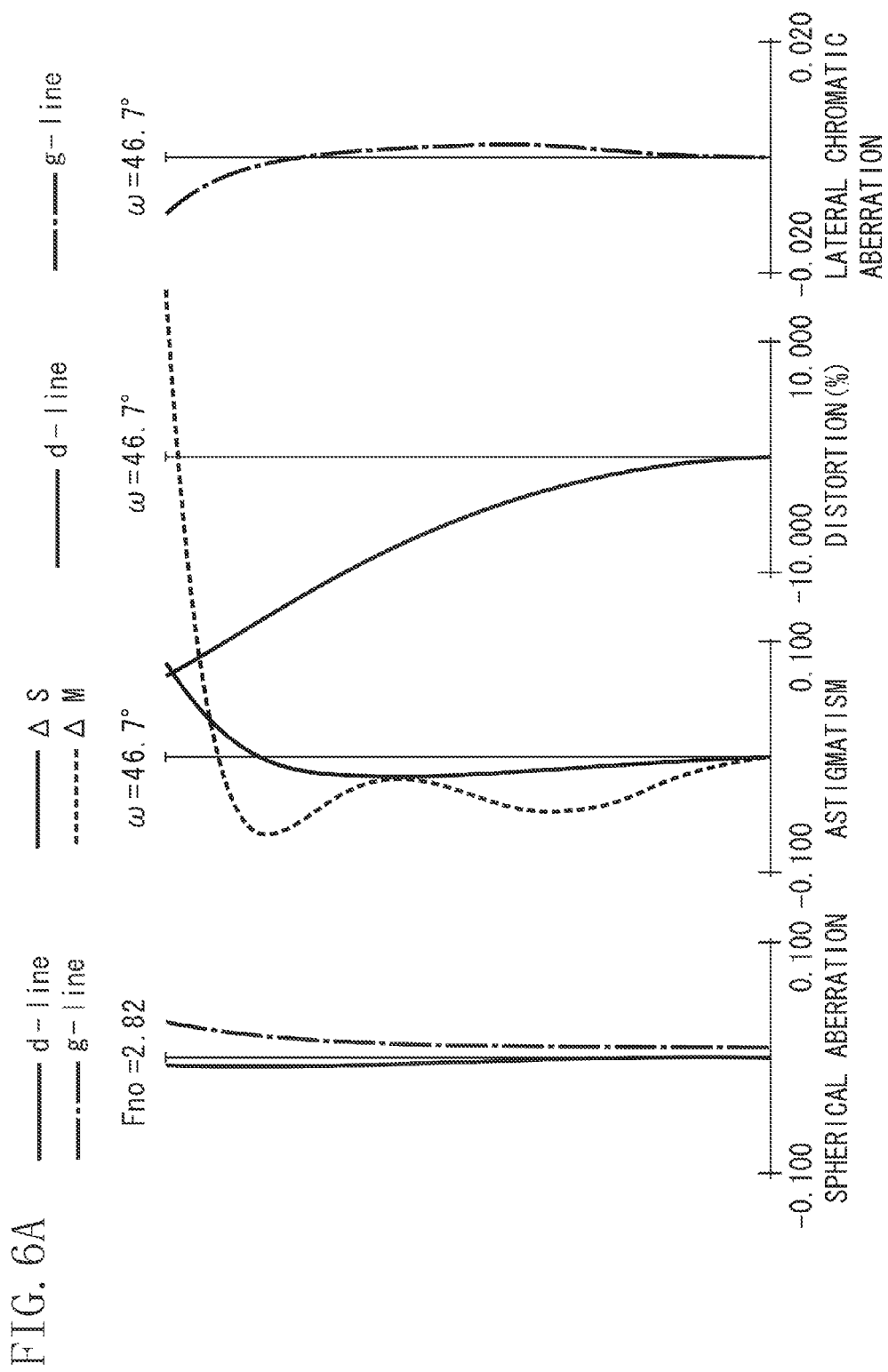

FIG. 5 is a cross section of a zoom lens according to a third exemplary embodiment of the present invention at the wide-angle end. FIGS. 6A through 6C are aberration charts of the zoom lens at the wide-angle end, at a middle focal length, and at the telephoto end, respectively, according to the third exemplary embodiment. The third exemplary embodiment is a zoom lens of a zoom ratio of 3.87 and an aperture ratio of 2.88 to 5.75.

Figure 8A:
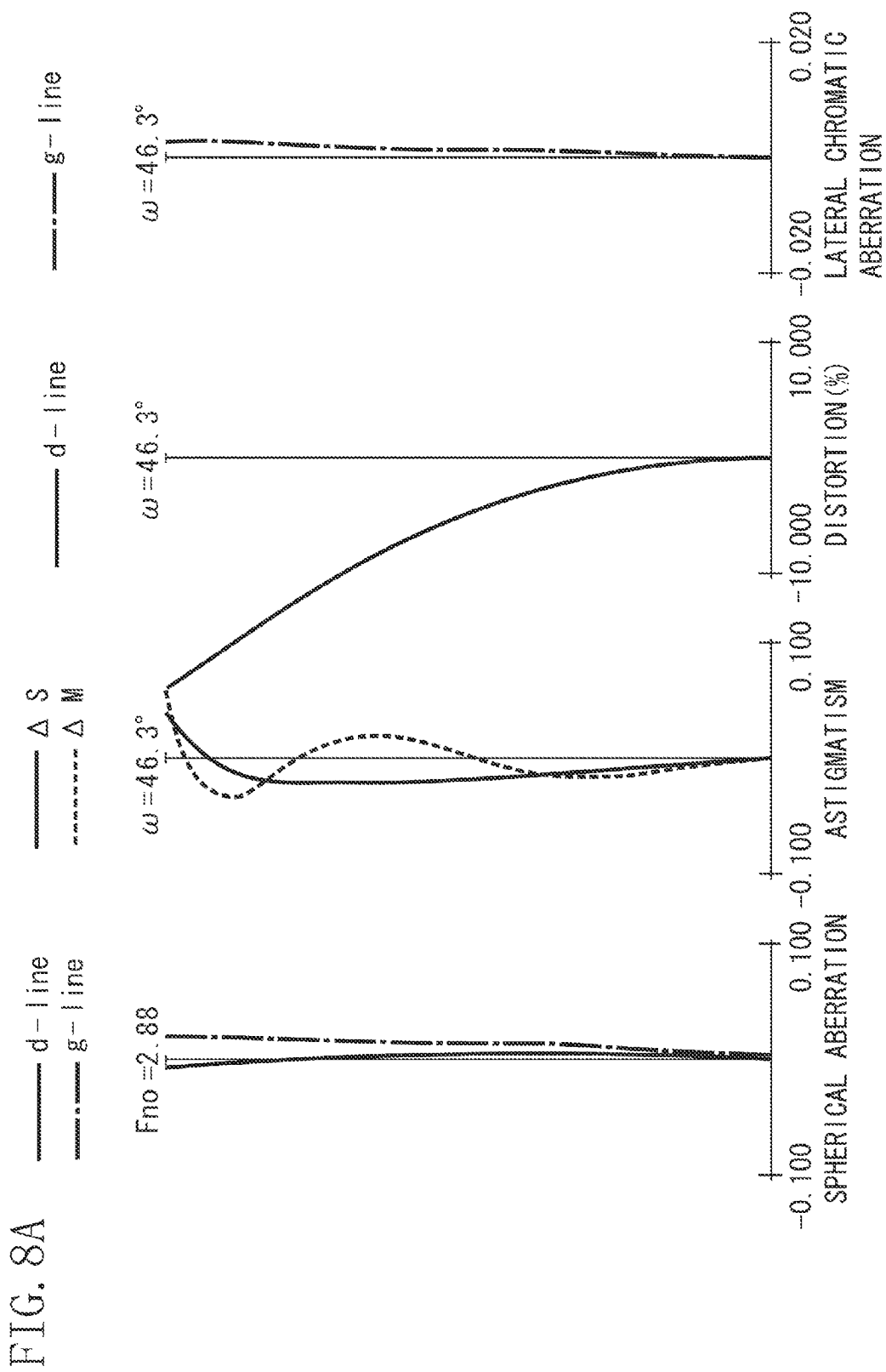
FIGS. 8A, 8B and 8C are aberration charts of the zoom lens at the wide-angle end, at a middle focal length, and at the telephoto end, respectively, according to the fourth exemplary embodiment.
Figure 8B:
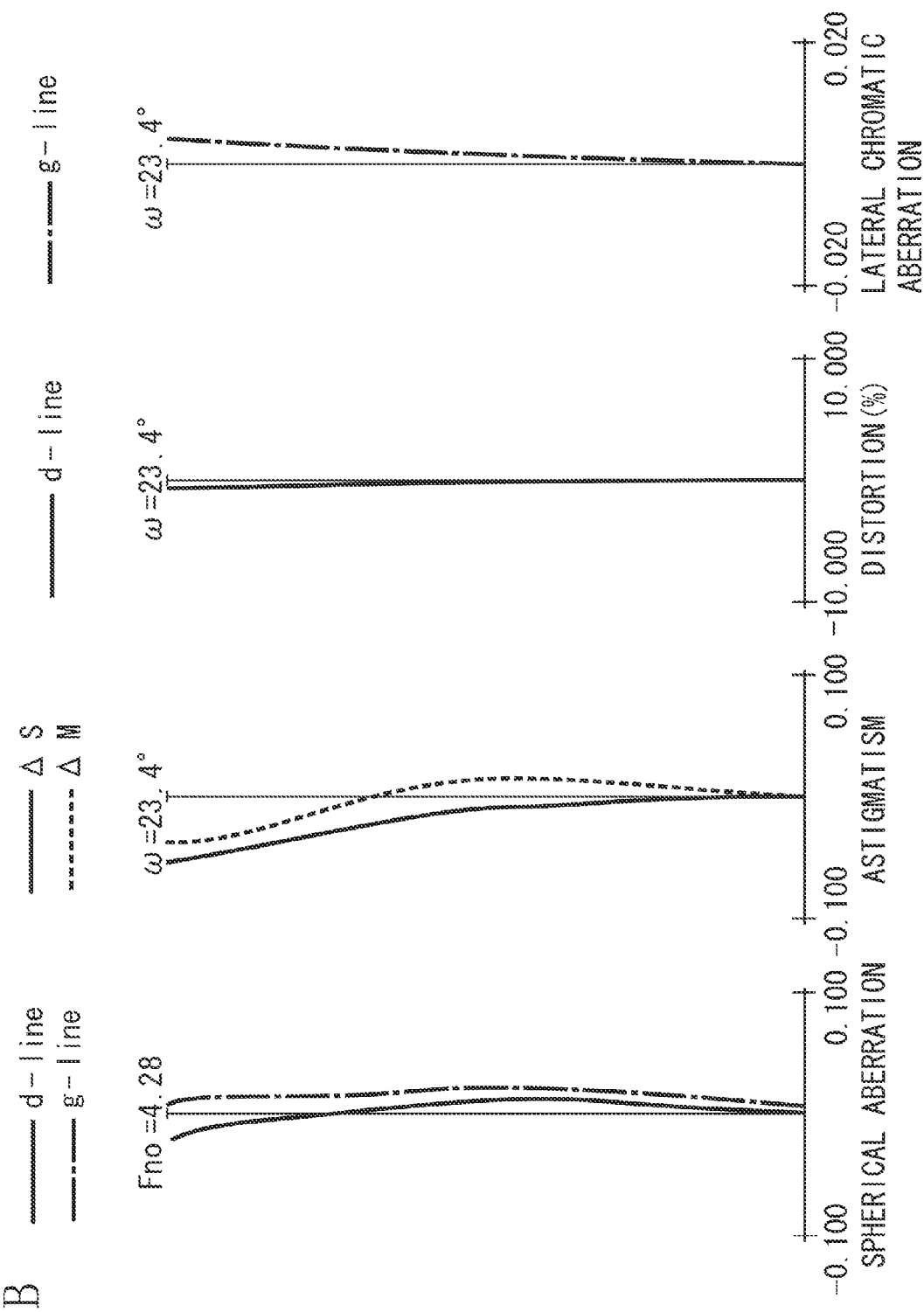
Figure 8C:
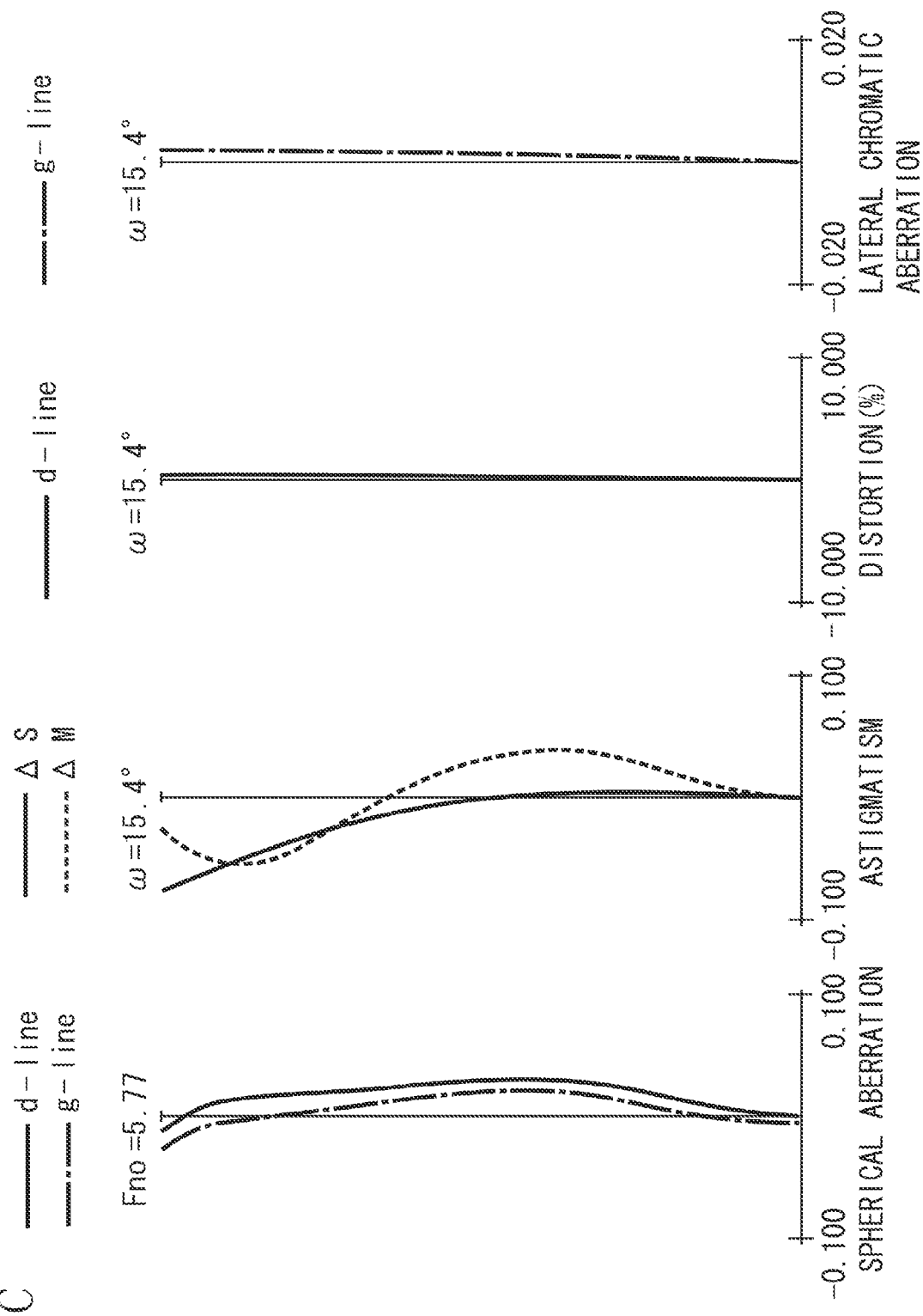

FIG. 7 is a cross section of a zoom lens according to a fourth exemplary embodiment of the present invention at the wide-angle end. FIGS. 8A through 8C are aberration charts of the zoom lens at the wide-angle end, at a middle focal length, and at the telephoto end, respectively, according to the fourth exemplary embodiment. The fourth exemplary embodiment is a zoom lens of a zoom ratio of 3.81 and an aperture ratio of 2.88 to 5.77.

Figure 9:
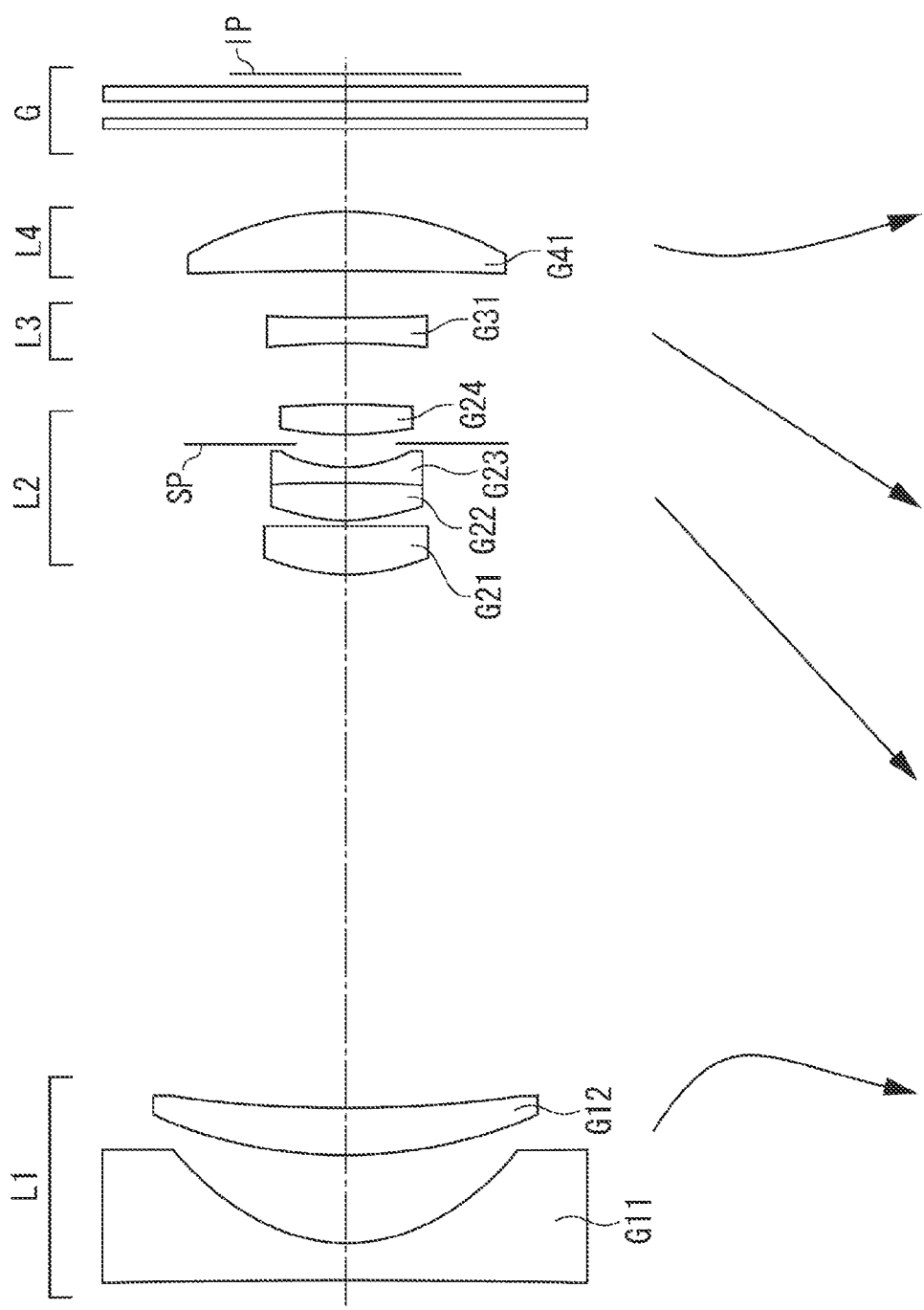
FIG. 9 is a cross section of a zoom lens according to a fifth exemplary embodiment of the present invention at the wide-angle end.
Figure 10A:
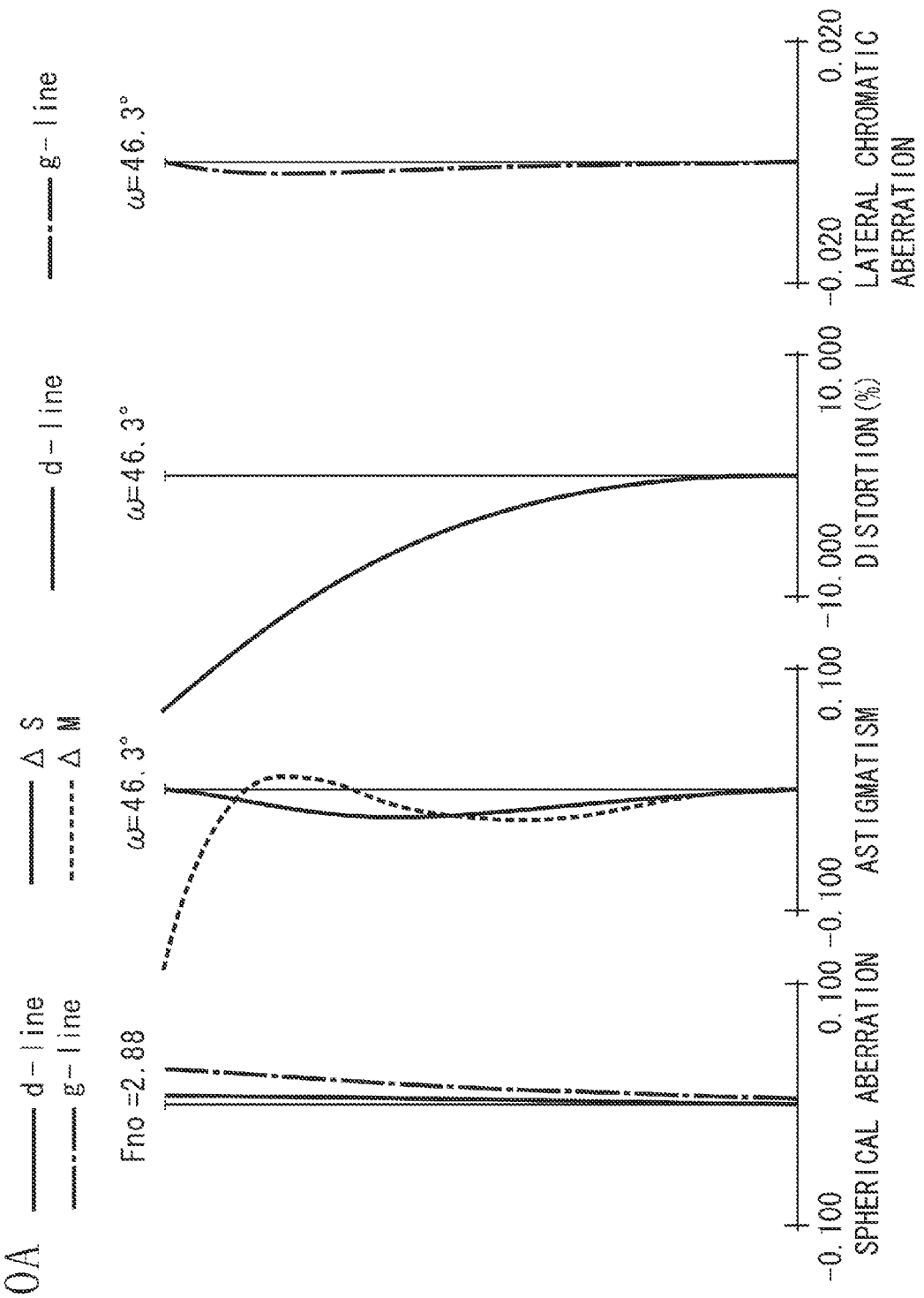

FIG. 9 is a cross section of a zoom lens according to a fifth exemplary embodiment of the present invention at the wide-angle end. FIGS. 10A through 10C are aberration charts of the zoom lens at the wide-angle end, at a middle focal length, and at the telephoto end, respectively, according to the fifth exemplary embodiment. The fifth exemplary embodiment is a zoom lens of a zoom ratio of 4.76 and an aperture ratio of 2.88 to 5.96.

Figure 12A:
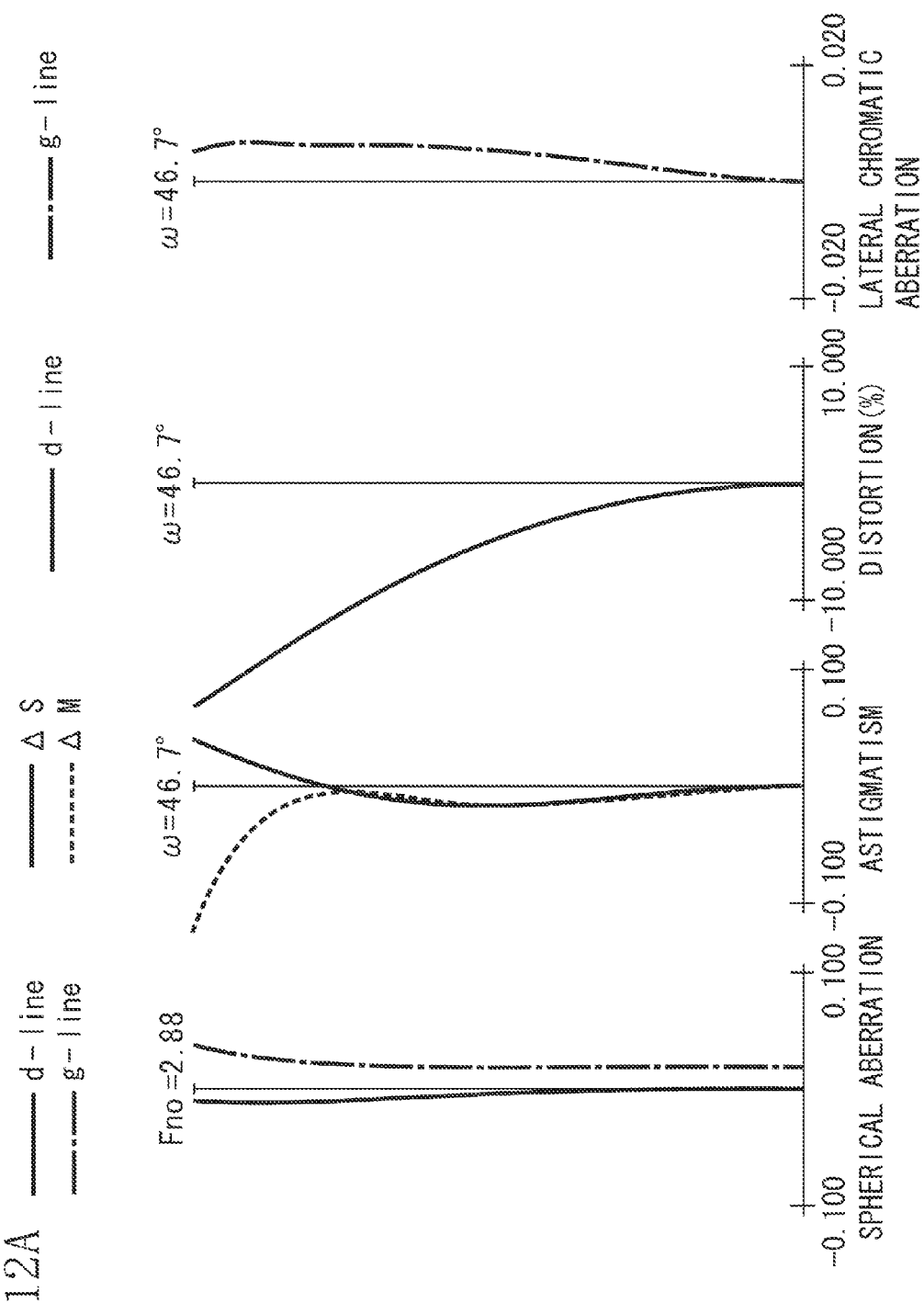
Figure 12B:
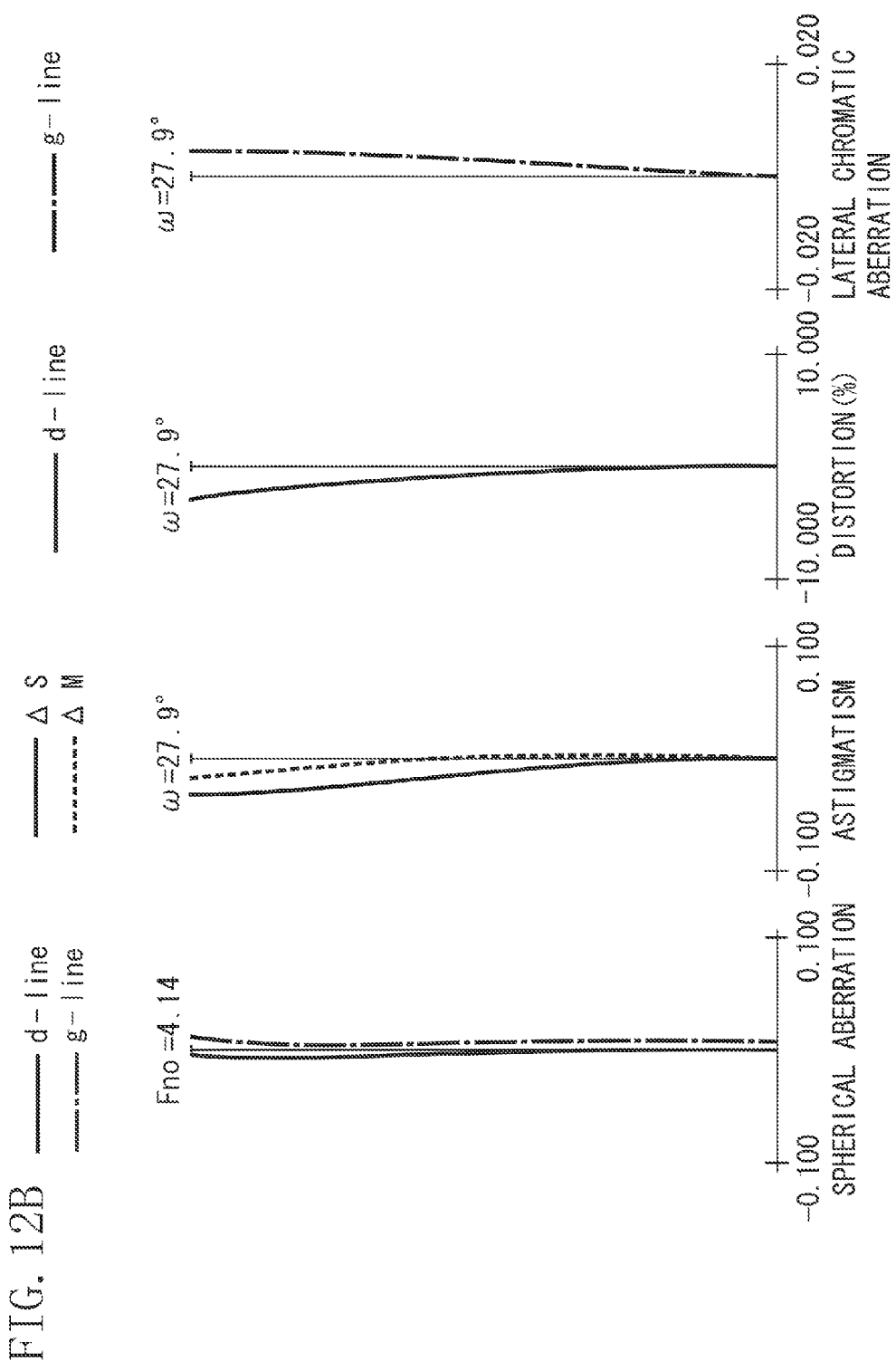
Figure 13:
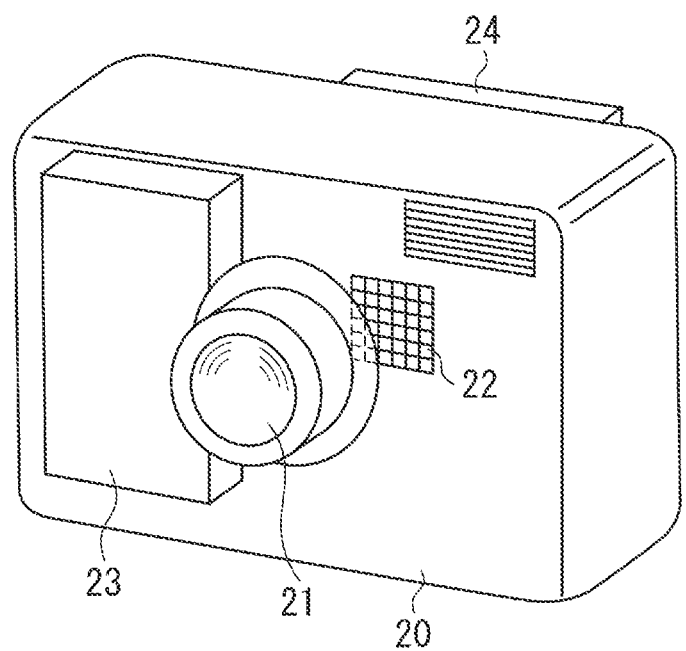
FIG. 13 illustrates exemplary main components of an image pickup apparatus according to an exemplary embodiment of the present invention.

FIG. 11 is a cross section of a zoom lens according to a sixth exemplary embodiment of the present invention at the wide-angle end. FIGS. 12A through 12C are aberration charts of the zoom lens at the wide-angle end, at a middle focal length, and at the telephoto end, respectively, according to the sixth exemplary embodiment. The sixth exemplary embodiment is a zoom lens of a zoom ratio of 2.93 and an aperture ratio of 2.88 to 5.36. FIG. 13 illustrates exemplary main components of a camera (image pickup apparatus) having the zoom lens according to an exemplary embodiment of the present invention.

The zoom lens according to each exemplary embodiment may be used as a photographic lens system for an image pickup apparatus, such as a video camera, a digital camera, or a silver-halide film camera. In addition, the zoom lens according to at least one exemplary embodiment may be used as a lens system for a image projection apparatus (projector).

In each cross section (FIGS. 1, 3, 5, 7, 9, and 11), an object side (front side) is illustrated at the left-hand portion of the drawing, and an image side (rear side) is illustrated at the right-hand portion thereof. The zoom lens according to each exemplary embodiment can be used for a projector. If the zoom lens according to each exemplary embodiment of the present invention is used as a projection lens for a projector, in each of the diagrams showing a cross section of the optical system (FIGS. 1, 3, 5, 7, 9, and 11), the side of a projection screen is shown at the left-hand portion of the drawing, and the side of an image to be projected is shown at the right-hand portion thereof.

Furthermore, in each of the diagrams showing a cross section of the zoom lens (FIGS. 1, 3, 5, 7, 9, and 11), "i" denotes an order of a lens unit from the object side. "Li" denotes an i-th lens unit. "Gij" denotes a j-th lens of the i-th lens unit Li. In FIG. 9, "SP" denotes an aperture stop. The aperture stop SP, when required, is provided within the second lens unit L2. "G" denotes an optical block equivalent to an optical filter, a faceplate, a low-pass filter, or an infrared-ray cut filter.

"IP" denotes an image plane. The image plane IP is, when the zoom lens according to an exemplary embodiment of the present invention is used as a photographic optical system of a video camera or a digital camera, equivalent to an imaging plane of a solid-state image sensor (photoelectric conversion element), such as a charge-coupled device (CCD) sensor or a complementary metal-oxide semiconductor (CMOS) sensor. The image plane IP is, when the optical system is used as a photographic optical system of a silver-halide film camera, equivalent to the position of a film (photosensitive) surface. An arrow indicates a locus of movement of each lens unit during zooming from the wide-angle end to the telephoto end.

In each aberration chart (FIGS. 2A through 2C, 4A through 4C, 6A through 6C, 8A through 8C, 10A through 10C, and 12A through 12C), "d" and "g" respectively denotes d-line light and g-line light. Furthermore, "ΔM" and "ΔS" respectively denote a meridional image plane and a sagittal image plane. Chromatic aberration of magnification is represented with respect to g-line light. "ω" denotes a half angle of view. "Fno" denotes an F-number.

In each of the following exemplary embodiments, each of the wide-angle end and the telephoto end refers to a zooming position when a magnification varying lens unit (for example, the second lens unit L2) is positioned at each of the ends of a range in which the magnification varying lens unit can mechanically move along the optical axis.

The zoom lens according to each exemplary embodiment includes, in order from the object side to the image side, a first lens unit L1 having a negative refractive power, a second lens unit L2 having a positive refractive power, a third lens unit L3 having a negative refractive power, and a fourth lens unit L4 having a positive refractive power.

During zooming, the interval (distance) between consecutive lens units is changed. More specifically, during zooming from the wide-angle end to the telephoto end, the first lens unit L1 moves along a locus convex towards the image side to correct variation on the image plane that may occur during variable magnification.

The second lens unit L2 moves towards the object side. The third lens unit L3 moves towards the object side. The fourth lens unit L4 moves monotonously towards the image side or towards the object side or moves along a locus convex towards the object side or is stationary during zooming.

The first lens unit L1 includes, in order from the object side to the image side, a negative lens and a positive lens whose surface on the object side has a convex shape.

When f1 is a focal length of the first lens unit L1, f3 is a focal length of the third lens unit L3, dip is an Abbe number of a material of the positive lens of the first lens unit L1, f3$i$ is a focal length in air of an i-th single lens counted from the object side included in the third lens unit L3, υd3$i$ is an Abbe number of the material of the i-th single lens counted from the object side included in the third lens unit L3, and Σ is a sum with respect to the focal lengths f3$i$ and the Abbe numbers υd3$i$ of all the single lenses included in the third lens unit L3, the following conditions are satisfied:

$$0.30 < f1/f3 < 0.68 \qquad (1)$$

$$10.0 < \upsilon d1p < 23.0 \qquad (2)$$

$$2.1 < f3 \times \Sigma(100/(f3i \times \upsilon d3i)) < 5.0 \qquad (3).$$

In each exemplary embodiment, the first lens unit L1 includes a negative lens and a positive lens. With this configuration, each exemplary embodiment reduces the thickness of the first lens unit L1 and is capable of easily achieving a zoom lens whose total thickness is thin when retracted.

In the four-unit zoom lens having the above-described refractive power arrangement, in order to achieve a wide angle of view (shooting imaging angle) at the wide-angle end, it is necessary to increase the refractive power (optical power=an inverse of the focal length).

An exemplary method for effectively correcting chromatic aberration in the entire zoom lens by appropriately correcting chromatic aberration that may occur within each lens unit will be described in detail below.

If the ratio of Abbe numbers of the materials of the single lenses included in the first lens unit is set at a high value for achromatism within the first lens unit L1, the refractive power of the negative lens included in the first lens unit is decreased. Accordingly, curvature of field and chromatic aberration can be corrected. However, if the angle of view is further increased, in correcting chromatic aberration within the first lens unit, the Abbe number of the material of the positive lenses, which is used as a pair within the first lens unit, may be available only within a limited range.

Accordingly, the refractive power of the negative lens included in the first lens unit may become extremely high. As a result, if the first lens unit is to be constituted by one negative lens, it may become difficult to correct curvature of field.

In the present exemplary embodiment, the achromatism within first lens unit is intentionally set to be undercorrected and residual chromatic aberration is compensated by other lens units. In other words, by intentionally setting the achromatism by the lenses constituting the first lens unit to be undercorrected, the refractive power of the negative lens included in the first lens unit is decreased to a level low enough to effectively correct curvature of field.

In addition, by compensating residual chromatic aberration by the third lens unit having a negative refractive power, the present exemplary embodiment can balancedly correct curvature of field and chromatic aberration for the entire zoom range.

Among the method for correcting chromatic aberration for the entire zoom range, an exemplary method for correcting chromatic aberration of magnification, which may become remarkable at the wide-angle end, will be particularly described first below.

As described above, in the first lens unit, the achromatism within the first lens unit is undercorrected. On the other hand, the third lens unit having a negative refractive power is provided on the image side of a position of intersection, at the wide-angle end, of the principally ray at the most off-axis angle and the optical axis. In the third lens unit, chromatic aberration within the lens unit is set to be undercorrected.

With the above-described configuration, by utilizing the symmetry of the lens configuration of the zoom lens, chromatic aberration of magnification can be corrected for the entire zoom range.

Now, an exemplary method for correcting axial chromatic aberration (longitudinal chromatic aberration), which becomes remarkable at the telephoto end, will be described in detail below.

As described above, the first lens unit is a lens unit having a negative refractive power. In addition, the first lens unit is provided in a state in which chromatic aberration is undercorrected. Because the refractive power of the entire zoom lens is positive, an overall focal length of the combined lens unit of the second through fourth lens units becomes positive.

More specifically, in order to correct axial chromatic aberration for the entire zoom lens, it is necessary to set chromatic aberration in the combined lens unit having a positive refractive power to be overcorrected. Accordingly, by implementing the above-described state by providing the third lens unit having a negative refractive power, which constitutes the combined lens unit, in a state in which chromatic aberration within the lens unit is undercorrected, axial chromatic aberration can be corrected for the entire zoom lens.

As described above, in the present exemplary embodiment, the third lens unit, in which chromatic aberration within the lens unit is undercorrected, is provided while the achromatism in the first lens unit is set to be undercorrected. With the above-described configuration, the present exemplary embodiment can correct chromatic aberration for the entire zoom range.

The condition (1) provides a condition for a ratio between the focal length of the first lens unit L1 and the focal length of the third lens unit L3. If the zoom lens has the lens configuration that can satisfy the condition (1), the optical system can be provided with a wide angle of view and the zoom lens can effectively correct curvature of field and chromatic aberration.

If the upper limit value of the condition (1) is exceeded, then the refractive power of the first lens unit L1 may become extremely low. Accordingly, it becomes difficult to increase the angle of view of the zoom lens. Further, the refractive power of the third lens unit L3 may become extremely high. As a result, chromatic aberration that may occur in the entire zoom lens may become overcorrected.

On the other hand, if the lower limit value of the condition (1) is exceeded, then the refractive power of the first lens unit L1 may become extremely high. Accordingly, it becomes difficult to correct curvature of field. Further, the refractive power of or the third lens unit L3 may become extremely low. As a result, chromatic aberration that may occur in the entire zoom lens may become undercorrected.

The condition (2) provides a condition for the Abbe number of the material of a positive lens G12, which is included in the first lens unit L1. By setting the Abbe number of the material of the positive lens G12, which is included in the first lens unit L1, to be highly dispersible, the ratio between the Abbe number of the material of the positive lens G12 and the Abbe number of a negative lens G11, which is included in the first lens unit L1 together with the positive lens G12, becomes high and the refractive power of each single lens is set low. With the above-described configuration, the present exemplary embodiment can effectively correct curvature of field at the wide-angle end.

If the upper limit value of the condition (2) is exceeded, then the Abbe number of the material of the positive lens of the first lens unit L1 may become extremely high. Accordingly, the ratio between the Abbe numbers of the material of each single lens of the first lens unit may become low. Therefore, the refractive power of each single lens of the first lens unit L1 becomes high. As a result, it may become difficult to correct curvature of field.

On the other hand, if the lower limit value of the condition (2) is exceeded, then the Abbe number of the material of the positive lens of the first lens unit L1 may become extremely low. Accordingly, the achromatism in the first lens unit L1 may become intense. As a result, chromatic aberration that may occur in the entire zoom lens may become overcorrected.

The condition (3) provides a condition for the state of achromatism within the third lens unit L3. By intentionally setting the achromatism within the third lens unit L3 to be undercorrected, residual chromatic aberration in the first lens unit L1 can be compensated well and chromatic aberration can be effectively corrected for the entire zoom range.

If the upper limit value of the condition (3) is exceeded, then chromatic aberration occurring in the third lens unit L3 may become extremely large in relation to the amount necessary for correcting chromatic aberration remaining in the first lens unit L1. On the other hand, if the lower limit value of the condition (3) is exceeded, then chromatic aberration occurring in the third lens unit L3 may become extremely small in relation to the amount necessary for correcting chromatic aberration remaining in the first lens unit L1.

In each exemplary embodiment, the range of the values in the conditions (1) through (3) can be altered as follows:

$$0.35 < f1/f3 < 0.67 \quad (1a)$$

$$12.0 < vd1p < 22.5 \quad (2a)$$

$$2.2 < f3 \times \Sigma(100/(\beta i \times vd3i)) < 4.5 \quad (3a).$$

In each exemplary embodiment, the range of the values in the conditions (1a) through (3a) can be altered as follows:

$$0.40 < f1/f3 < 0.66 \quad (1b)$$

$$14.0 < vd1p < 22.0 \quad (2b)$$

$$2.3 < f3 \times \Sigma(100/(\beta i \times vd3i)) < 4.0 \quad (3b).$$

According to each exemplary embodiment, in a negative lead type four-unit zoom lens, the lens configurations of the first lens unit L1 and the third lens unit L3 are optimized as described above. With the above-described optimum lens configuration, each exemplary embodiment of the present invention can achieve a zoom lens which has a wide angle of view, whose thickness of the retractable lens barrel can become sufficiently thin when retracted, which is capable of effectively correcting curvature of field and chromatic aberration for the entire zoom range, and which has a high optical performance.

In order to more effectively reducing the total size of the zoom lens and increasing the angle of view while more effectively achieving a high optical performance, at least one of the following conditions can be satisfied. More specifically, when fw is a focal length of the entire zoom lens at the wide-angle end of the entire zoom lens, D23w is an interval between the second lens unit L2 and the third lens unit L3 at the wide-angle end of the zoom lens, D23t is an interval between the second lens unit L2 and the third lens unit L3 at the telephoto end of the zoom lens, and f2 is a focal length of the second lens unit L2, at least one of the following conditions is satisfied:

$$3.7 < |f3/fw| < 6.5 \quad (4)$$

$$0.2 < D23w/D23t < 0.9 \quad (5)$$

$$1.9<|f1/fw|<3.0 \quad (6)$$

$$1.5<|f2/fw|<3.0 \quad (7).$$

The technical significance of each condition will be described in detail below.

The condition (4) provides a condition for the focal length of the third lens unit L3. By assigning the refractive power that can satisfy the condition (4) to the third lens unit L3, chromatic aberration can be effectively corrected for the entire zoom range.

If the upper limit value of the condition (4) is exceeded, then the refractive power of the third lens unit L3 may become extremely low. As a result, chromatic aberration in the entire zoom lens may become undercorrected. On the other hand, if the lower limit value of the condition (4) is exceeded, then the refractive power of the third lens unit L3 may become extremely high. As a result, chromatic aberration in the entire zoom lens may become overcorrected.

The condition (5) provides a condition for the relative position of the third lens unit L3 in the direction of the optical axis at the wide-angle end and at the telephoto end. By locating the third lens unit L3 at the position that can satisfy the condition (5), chromatic aberration of magnification and axial chromatic aberration can be well-balancedly corrected.

If the upper limit value of the condition (5) is exceeded, then the variation of the position of the third lens unit L3 at the wide-angle end and at the telephoto end may decrease. Accordingly, it may become difficult to correct chromatic aberration of magnification at the wide-angle end and axial chromatic aberration at the telephoto end.

On the other hand, if the lower limit value of the condition (5) is exceeded, then the location of the third lens unit L3 may become too distant from the second lens unit L2 at the telephoto end. As a result, it may become difficult to correct axial chromatic aberration.

The condition (6) provides a condition for the focal length of the first lens unit L1. By assigning the refractive power that can satisfy the condition (6) to the first lens unit L1, each exemplary embodiment can increase the angle of view and effectively correct curvature of field.

If the upper limit value of the condition (6) is exceeded, then the refractive power of the first lens unit L1 may become extremely low. As a result, it may become difficult to achieve a wide angle of view in the zoom lens. On the other hand, if the lower limit value of the condition (6) is exceeded, then the refractive power of the first lens unit L1 may become extremely high. As a result, it may become difficult to correct curvature of field.

The condition (7) provides a condition for the focal length of the second lens unit L2. By assigning the refractive power that can satisfy the condition (7) to the second lens unit L2, each exemplary embodiment can effectively correct the variation of curvature of field that may occur during zooming while achieving a zoom lens whose total size is small.

If the upper limit value of the condition (7) is exceeded, then the refractive power of the second lens unit L2 may become extremely low. As a result, the stroke of the second lens unit L2 necessary during zooming may become very long in order to achieve a desired appropriate zoom ratio. Accordingly, in this case, the total size of the zoom lens may increase.

On the other hand, if the lower limit value of the condition (7) is exceeded, then the refractive power of the second lens unit L2 may become extremely high. As a result, it may become difficult to correct the variation of the curvature of field that may occur during zooming.

It is further useful if the ranges of the values in the conditions (4) through (7) are altered as follows:

$$3.8<|f3/fw|<6.0 \quad (4a)$$

$$0.2<D23w/D23t<0.8 \quad (5a)$$

$$2.0<|f1/fw|<2.9 \quad (6a)$$

$$1.7<|f2/fw|<2.8 \quad (7a).$$

It is yet further useful if the ranges of the values in the conditions (4a) through (7a) are altered as follows:

$$3.9<|f3/fw|<5.5 \quad (4b)$$

$$0.2<D23w/D23t<0.7 \quad (5b)$$

$$2.0<|f1/fw|<2.8 \quad (6b)$$

$$1.8<|f2/fw|<2.6 \quad (7b).$$

In each exemplary embodiment of the present invention, the third lens unit L3 is constituted by one lens component. In the present exemplary embodiment, the term "lens component" (i.e., instead of using the mere term of "lens") indicates that the third lens unit L3 is constituted by a single lens or a cemented lens. With the third lens unit L3 constituted by one lens component, it becomes easy to reduce the thickness of the retractable lens barrel. If the third lens unit L3 is used as a focusing lens unit, the total weight of the zoom lens can be easily reduced and focusing can be quickly executed.

In each exemplary embodiment, the fourth lens unit L4 is constituted by one lens component. With the fourth lens unit L4 constituted by one lens component, it becomes easy to reduce the thickness of the retractable lens barrel. If the fourth lens unit L4 is used as a focusing lens unit, the total weight of the zoom lens can be easily reduced and focusing can be quickly executed.

In the first through fifth exemplary embodiments, the fourth lens unit L4 is movable during zooming. With the fourth lens unit L4 that is movable during zooming, variation of curvature of field that may occur during zooming can be effectively corrected.

If the fourth lens unit L4 moves along a locus convex towards the object side during zooming from the wide-angle end to the telephoto end, the fourth lens unit L4 can be assigned with a share of a power increasing function. As a result, it becomes easy to achieve a zoom lens having a high zoom ratio.

As described above, according to each exemplary embodiment of the present invention, a negative lead type four-unit zoom lens whose thickness can become thin when retracted, which is capable of effectively correcting various aberrations, such as curvature of field and chromatic aberration, and which has a high optical performance for the entire zoom range can be achieved.

The zoom lens according to the first exemplary embodiment of the present invention will be described in detail below with reference to FIG. 1.

Referring to FIG. 1, during zooming from the wide-angle end to the telephoto end, the first lens unit L1 of the zoom lens according to the first exemplary embodiment moves along a locus convex towards the image side, as indicated by an arrow in FIG. 1, to compensate for the variation on the image plane that may occur due to variable magnification.

In addition, the second lens unit L2, the third lens unit L3, and the fourth lens unit L4 are magnification varying lens units. During variable magnification, the second lens unit L2 moves towards the object side, the third lens unit L3 moves towards the object side, and the fourth lens unit L4 moves towards the image side.

In the present exemplary embodiment, focusing is executed by moving the third lens unit L3 or the fourth lens unit L4 along the optical axis. In other words, the present exemplary embodiment employs an inner focus method. By using a lightweight lens unit as the focusing lens unit, focusing can be quickly executed.

In the following description, the lens configuration of each lens unit will be described in order from the object side to the image side.

The first lens unit L1 includes a negative lens G11 having a meniscus shape, whose lens surface on the image side has an aspheric shape, and a positive lens G12 having a meniscus shape, whose lens surface on the object side has an aspheric shape. With the above-described lens configuration, the thickness of the lens unit can be easily reduced.

The second lens unit L2 includes a positive lens G21 whose both surfaces have a convex shape and whose surface on the object side has an aspheric shape, a negative lens G22 whose both surfaces have a concave shape, and a positive lens G23 whose both surfaces have a convex shape and whose surface on the object side has an aspheric shape.

The third lens unit L3 includes a negative lens G31 whose both surfaces have a concave shape. With the above-described lens configuration, chromatic aberration remaining in the first lens unit L1 can be corrected. In addition, chromatic aberration can be appropriately corrected for the entire zoom range.

The fourth lens unit L4 includes one positive lens G41 whose both surfaces have a convex shape and whose lens surface on the object side has an aspheric shape.

The zoom lens according to the second exemplary embodiment of the present invention will be described in detail below with reference to FIG. 3.

Referring to FIG. 3, during zooming from the wide-angle end to the telephoto end, the first lens unit L1 of the zoom lens according to the present exemplary embodiment moves along a locus convex towards the image side, as indicated by an arrow in FIG. 3, to compensate for the variation on the image plane that may occur due to variable magnification.

In addition, the second lens unit L2, the third lens unit L3, and the fourth lens unit L4 are magnification varying lens units. During variable magnification, the second lens unit L2 and the third lens unit L3 move towards the object side. The fourth lens unit L4 moves along a locus convex towards the object side. Focusing is executed by a method similar to the focusing method according to the first exemplary embodiment described above with reference to FIG. 1.

In the following description, the lens configuration of each lens unit will be described in order from the object side to the image side.

The first lens unit L1 includes a negative lens G11, whose both surfaces have a concave shape and whose lens surface on the image side has an aspheric shape, and a positive lens G12 having a meniscus shape, whose lens surface on the object side has an aspheric shape. With the above-described lens configuration, the thickness of the lens unit L1 can be easily reduced.

The second lens unit L2 includes a positive lens G21 having a meniscus shape, whose lens surface on the object side has an aspheric shape, a positive lens G22 whose both surfaces have a convex shape, and a negative lens G23 having a meniscus shape whose lens surface on the image side has an aspheric shape. The third lens unit L3 includes a negative lens G31 whose both surfaces have a concave shape and whose both surfaces have an aspheric shape.

With the above-described lens configuration, chromatic aberration remaining in the first lens unit L1 can be compensated. In addition, chromatic aberration can be appropriately corrected for the entire zoom range.

The fourth lens unit L4 includes a positive lens G41 whose both surfaces have a convex shape and whose surface on the object side has an aspheric shape.

The zoom lens according to the third exemplary embodiment will be described in detail below with reference to FIG. 5. The zoom type and the focusing method of the present exemplary embodiment illustrated in FIG. 5 are similar to those of the second exemplary embodiment described above with reference to FIG. 3. The point in difference from the second exemplary embodiment is that the present exemplary embodiment has a lens configuration of each lens unit different from that of the second exemplary embodiment.

In the following description, the lens configuration of each lens unit of FIG. 5 will be described in order from the object side to the image side.

The first lens unit L1 includes a negative lens G11 having a meniscus shape, whose lens surface on the image side has an aspheric shape, and a positive lens G12 having a meniscus shape, whose lens surface on the object side has an aspheric shape. With the above-described lens configuration, the thickness of the lens unit can be easily reduced. The second lens unit L2 includes a positive lens G21 whose both surfaces have a convex shape and whose surface on the object side has an aspheric shape, a negative lens G22 whose both surfaces have a concave shape, and a positive lens G23 whose both surfaces have a convex shape and whose surface on the object side has an aspheric shape.

The third lens unit L3 includes a cemented lens, which is constituted by bonding a positive lens G31 whose both surfaces have a convex shape and whose surface on the object side has an aspheric shape and a negative lens G32 whose both surfaces have a concave shape together. With the above-described lens configuration, chromatic aberration remaining in the first lens unit L1 can be compensated. In addition, chromatic aberration can be appropriately corrected for the entire zoom range.

The fourth lens unit L4 includes a positive lens G41 whose both surfaces have a convex shape and whose surface on the object side has an aspheric shape.

The zoom lens according to the fourth exemplary embodiment will be described in detail below with reference to FIG. 7.

Referring to FIG. 7, during zooming from the wide-angle end to the telephoto end, the first lens unit L1 of the zoom lens according to the present exemplary embodiment moves along a locus convex towards the image side, as indicated by an arrow in FIG. 7, to compensate for the variation on the image plane that may occur due to variable magnification.

In addition, the second lens unit L2, the third lens unit L3, and the fourth lens unit L4 are magnification varying lens units. During variable magnification, the second lens unit L2, the third lens unit L3, and the fourth lens unit L4 move towards the object side. Focusing is executed by a method similar to the focusing method according to the first exemplary embodiment described above with reference to FIG. 1.

In the following description, the lens configuration of each lens unit will be described in order from the object side to the image side.

The first lens unit L1 includes a negative lens G11 having a meniscus shape, whose lens surface on the image side has an aspheric shape, and a positive lens G12 having a meniscus shape, whose lens surface on the object side has an aspheric shape. With the above-described lens configuration, the thickness of the lens unit L1 can be easily reduced.

The second lens unit L2 includes a positive lens G21 having a meniscus shape, whose lens surface on the object side has an aspheric shape, a negative lens G22 having a meniscus shape, and a positive lens G23 whose both surfaces have a convex shape and whose surface on the object side has an aspheric shape. The third lens unit L3 includes a negative lens G31 having a meniscus shape whose surface on the image side has an aspheric shape.

With the above-described lens configuration, chromatic aberration remaining in the first lens unit L1 can be compensated. In addition, chromatic aberration can be appropriately corrected for the entire zoom range.

The fourth lens unit L4 includes a cemented lens, which is constituted by bonding a positive lens G41 whose both surfaces have a convex shape and whose surface on the object side has an aspheric shape, and a negative lens G42 having a meniscus shape together.

The zoom lens according to the fifth exemplary embodiment will be described in detail below with reference to FIG. 9.

The zoom type and the focusing method of the present exemplary embodiment illustrated in FIG. 9 are similar to those of the second exemplary embodiment described above with reference to FIG. 3. The point in difference from the second exemplary embodiment is that the present exemplary embodiment has a zoom ratio and a lens configuration of each lens unit different from those of the second exemplary embodiment.

In the following description, the lens configuration of each lens unit will be described in order from the object side to the image side.

The first lens unit L1 includes a negative lens G11, whose both surfaces have a concave shape and whose lens surface on the image side has an aspheric shape, and a positive lens G12 having a meniscus shape whose lens surface on the object side has an aspheric shape. With the above-described configuration, the present exemplary embodiment can easily reduce the thickness of the lens unit L1.

The second lens unit L2 includes a positive lens G21 having a meniscus shape, whose lens surface on the object side has an aspheric shape, a cemented lens constituted by bonding a positive lens G22 whose both surfaces have a convex shape and a negative lens G23 whose both surfaces have a concave shape together, an aperture stop SP, and a positive lens G24 whose both surfaces have a convex shape. The third lens unit L3 includes a negative lens G31 having a meniscus shape whose both surfaces have an aspheric shape.

With the above-described configuration, the present exemplary embodiment can compensate for chromatic aberration remaining in the first lens unit L1. In addition, chromatic aberration can be appropriately corrected for the entire zoom range. The fourth lens unit L4 includes a positive lens G41 having a meniscus shape whose lens surface on the image side has an aspheric shape.

The zoom lens according to the sixth exemplary embodiment will be described in detail below with reference to FIG. 11.

Referring to FIG. 11, during zooming from the wide-angle end to the telephoto end, the first lens unit L1 of the zoom lens according to the present exemplary embodiment moves along a locus convex towards the image side, as indicated by an arrow in FIG. 11, to compensate for the variation on the image plane that may occur due to variable magnification.

In addition, the second lens unit L2 and the third lens unit L3 are magnification varying lens units. The second lens unit L2 and the third lens unit L3 move towards the object side. The fourth lens unit L4 is stationary in relation to the image plane. In the present exemplary embodiment, focusing is executed by moving the third lens unit L3 or the fourth lens unit L4 along the optical axis. In other words, the present exemplary embodiment employs the inner focus method. By using a lightweight lens unit as the focusing lens unit, quick focusing can be easily executed.

In the following description, the lens configuration of each lens unit will be described in order from the object side to the image side.

The first lens unit L1 includes a negative lens G11 having a meniscus shape, whose lens surface on the image side has an aspheric shape, and a positive lens G12 having a meniscus shape, whose lens surface on the object side has an aspheric shape. With the above-described lens configuration, the thickness of the lens unit L1 can be easily reduced.

The second lens unit L2 includes a positive lens G21 whose both surfaces have a convex shape and whose surface on the object side has an aspheric shape, a negative lens G22 whose both surfaces have a concave shape, and a positive lens G23 whose both surfaces have a convex shape and whose surface on the object side has an aspheric shape. The third lens unit L3 includes a negative lens G31 whose both surfaces have a concave shape. With the above-described lens configuration, chromatic aberration remaining in the first lens unit L1 can be compensated. In addition, chromatic aberration can be appropriately corrected for the entire zoom range.

The fourth lens unit L4 includes one positive lens G41 whose both surfaces have a convex shape and whose lens surface on the object side has an aspheric shape.

Numerical examples 1 through 6, which respectively correspond to the first through sixth exemplary embodiments of the present invention, are set forth below. In each of the numerical examples 1 through 6, "i" denotes the order of a surface from the object side, "ri" denotes a radius of curvature of an i-th optical surface (i-th lens surface), "di" denotes an axial space between the i-th surface and the (i+1)-th surface, "ndi" and "υdi" respectively denote a refractive index and an Abbe number of the material of the i-th optical member with respect to d-line light.

In addition, aspherical surfaces are marked with an asterisk (*) on the side of the surface number, and each of "B", "C", "D", and "E" denotes an aspheric coefficient for each corresponding order. The aspheric shape is expressed as $$x = (h^2/R)/[1+\{1-(1+k)*(h/R)^2\}^{1/2}] + B*h^4 + C*h^6 + D*h^8 + E*h^{10}$$

where the aspheric shape has a positive value in the direction of travel of light, "x" denotes a displacement from a surface vertex along the optical axis in a position at a height "h" from the optical axis, "R" denotes a paraxial radius of curvature, and "k" denotes a conic constant. Furthermore, the scientific notation "e±XX" for each aspheric coefficient is equivalent to the exponential notation "$1 \times 10^{\pm XX}$". The relationship between each condition described above and each numerical example is set forth in Table 1.

Numerical Example 1

Unit: mm

Surface Data

| Surface No. | r | d | nd | vd | Effective diameter |
|---|---|---|---|---|---|
| 1 | 55.748 | 1.05 | 1.86400 | 40.6 | 13.42 |
| 2* | 4.639 | 2.79 | | | 9.69 |
| 3* | 9.982 | 1.50 | 2.10225 | 16.8 | 9.75 |
| 4 | 15.905 | Variable | | | 9.24 |
| 5* | 5.263 | 1.56 | 1.77250 | 49.6 | 3.98 |
| 6 | −125.715 | 0.61 | | | 3.73 |
| 7 | −9.506 | 0.80 | 1.84666 | 23.8 | 3.53 |
| 8 | 33.292 | 1.00 | | | 3.63 |
| 9* | 37.457 | 1.03 | 1.59201 | 67.0 | 4.14 |
| 10 | −6.580 | Variable | | | 4.39 |
| 11 | −85.645 | 0.80 | 1.80610 | 33.3 | 4.73 |
| 12 | 13.856 | Variable | | | 4.87 |
| 13* | 18.432 | 1.40 | 1.77250 | 49.6 | 8.86 |
| 14 | −52.076 | Variable | | | 8.85 |
| 15 | ∞ | 0.30 | 1.51633 | 64.1 | 15.00 |
| 16 | ∞ | 0.62 | | | 15.00 |
| 17 | ∞ | 0.50 | 1.51633 | 64.1 | 15.00 |
| 18 | ∞ | 0.49 | | | 15.00 |
| Image plane | ∞ | | | | |

Aspheric Coefficients

| | k | B | C |
|---|---|---|---|
| R2 | −1.16473e+00 | 6.14057e−04 | 1.43063e−05 |
| R3 | −8.11060e−01 | 1.11238e−04 | 5.60552e−06 |
| R5 | 1.47932e−01 | 5.61479e−05 | 4.26195e−05 |
| R9 | −1.54019e+02 | −2.43592e−03 | −1.34080e−04 |
| R13 | 0.00000e+00 | −1.12870e−04 | 3.87531e−06 |

| | D | E |
|---|---|---|
| R2 | −4.22062e−07 | 8.26115e−09 |
| R3 | −1.86803e−07 | 3.88923e−09 |
| R5 | −7.63667e−06 | 9.70790e−07 |
| R9 | 1.38647e−05 | −2.19415e−06 |
| R13 | −1.09143e−07 | 3.02799e−09 |

Various Data
Zoom Ratio 3.87

| | Wide-Angle End | Middle Focal Length | Telephoto End |
|---|---|---|---|
| Focal Lengths | 3.66 | 9.27 | 14.20 |
| F-number | 2.82 | 4.39 | 5.96 |
| Angle of View | 46.64 | 22.72 | 15.28 |
| Image Height | 3.88 | 3.88 | 3.88 |
| Lens Total Length | 34.40 | 30.22 | 34.84 |
| BF | 0.49 | 0.49 | 0.49 |
| d4 | 14.08 | 3.28 | 1.28 |
| d10 | 1.32 | 2.57 | 2.38 |
| d12 | 1.27 | 7.40 | 14.39 |
| d14 | 3.29 | 2.53 | 2.34 |
| Entrance Pupil Position | 6.01 | 4.05 | 3.37 |
| Exit Pupil Position | −14.40 | −50.33 | 174.41 |
| Front Principal Point Position | 8.77 | 11.62 | 18.72 |
| Rear Principal Point Position | −3.18 | −8.78 | −13.71 |

Various Data of Each Lens Unit

| Lens Unit | First Surface | Focal Length | Lens Config. Length | Front Principal Point Position | Rear Principal Point Position |
|---|---|---|---|---|---|
| 1 | 1 | −9.15 | 5.34 | −0.09 | −4.29 |
| 2 | 5 | 7.61 | 5.00 | 1.69 | −2.81 |
| 3 | 11 | −14.74 | 0.80 | 0.38 | −0.06 |
| 4 | 13 | 17.78 | 1.40 | 0.21 | −0.59 |
| 5 | 15 | ∞ | 1.42 | 0.57 | −0.57 |

Single Lens Data

| Lens | First Surface | Focal Length |
|---|---|---|
| 1 | 1 | −5.91 |
| 2 | 3 | 21.47 |
| 3 | 5 | 6.57 |
| 4 | 7 | −8.66 |
| 5 | 9 | 9.54 |
| 6 | 11 | −14.74 |
| 7 | 13 | 17.78 |

Numerical Example 2

Unit: mm

Surface Data

| Surface No. | r | d | nd | vd | Effective diameter |
|---|---|---|---|---|---|
| 1 | −83.162 | 1.10 | 1.86400 | 40.6 | 13.51 |
| 2* | 5.728 | 2.55 | | | 10.59 |
| 3* | 17.292 | 1.80 | 2.01960 | 21.5 | 10.92 |
| 4 | 136.719 | Variable | | | 10.68 |
| 5* | 6.510 | 1.40 | 1.76802 | 49.2 | 4.43 |
| 6 | 9.427 | 0.30 | | | 4.15 |
| 7 | 4.614 | 1.50 | 1.59201 | 67.0 | 4.17 |
| 8 | −17.184 | 0.10 | | | 3.94 |
| 9 | 10.274 | 0.60 | 1.84666 | 23.8 | 3.80 |
| 10* | 4.170 | Variable | | | 3.48 |
| 11* | −27.567 | 0.80 | 1.73077 | 40.5 | 4.90 |
| 12* | 29.117 | Variable | | | 5.08 |
| 13* | 69.054 | 1.80 | 1.77250 | 49.6 | 9.01 |
| 14 | −12.263 | Variable | | | 9.20 |
| 15 | ∞ | 0.30 | 1.51633 | 64.1 | 15.00 |
| 16 | ∞ | 0.62 | | | 15.00 |
| 17 | ∞ | 0.50 | 1.51633 | 64.1 | 15.00 |
| 18 | ∞ | 0.32 | | | 15.00 |
| Image plane | ∞ | | | | |

Aspheric Coefficients

| | k | B | C |
|---|---|---|---|
| R2 | −1.23375e+00 | 3.02144e−04 | −1.38956e−06 |
| R3 | 0.00000e+00 | 7.97369e−05 | 1.31876e−07 |
| R5 | −2.77657e−01 | −2.24254e−04 | −3.18520e−06 |
| R10 | 0.00000e+00 | 2.33025e−03 | 2.61664e−04 |
| R11 | 0.00000e+00 | 1.51189e−03 | −1.90729e−04 |

-continued

Unit: mm

| | | | |
|---|---|---|---|
| R12 | 0.00000e+00 | 2.19812e-03 | -1.65620e-04 |
| R13 | 0.00000e+00 | -7.28085e-05 | 1.34401e-05 |

| | D | E |
|---|---|---|
| R2 | 2.40245e-07 | -4.44506e-09 |
| R3 | 7.57281e-08 | -9.26333e-10 |
| R5 | -3.74995e-06 | 1.40566e-07 |
| R10 | -1.74301e-05 | 7.05706e-06 |
| R11 | 2.11061e-05 | -1.48722e-06 |
| R12 | 1.47354e-05 | -1.01551e-06 |
| R13 | -8.22095e-07 | 1.61288e-08 |

Various Data
Zoom Ratio 3.81

| | Wide-Angle End | Middle Focal Length | Telephoto End |
|---|---|---|---|
| Focal Lengths | 4.12 | 9.71 | 15.70 |
| F-number | 2.88 | 4.23 | 5.96 |
| Angle of View | 43.28 | 21.78 | 13.88 |
| Image Height | 3.88 | 3.88 | 3.88 |
| Lens Total Length | 38.00 | 29.81 | 32.01 |
| BF | 0.32 | 0.32 | 0.32 |
| d4 | 17.45 | 4.13 | 1.21 |
| d10 | 2.60 | 5.58 | 7.64 |
| d12 | 1.50 | 3.24 | 7.18 |
| d14 | 2.76 | 3.16 | 2.29 |
| Entrance Pupil Position | 6.63 | 4.29 | 3.30 |
| Exit Pupil Position | -16.36 | -40.78 | 165.38 |
| Front Principal Point Position | 9.73 | 11.70 | 20.49 |
| Rear Principal Point Position | -3.80 | -9.39 | -15.38 |

Various Data of Each Lens Unit

| Lens Unit | First Surface | Focal Length | Lens Config. Length | Front Principal Point Position | Rear Principal Point Position |
|---|---|---|---|---|---|
| 1 | 1 | -11.17 | 5.45 | -0.88 | -5.48 |
| 2 | 5 | 8.85 | 3.90 | -1.31 | -3.13 |
| 3 | 11 | -19.26 | 0.80 | 0.22 | -0.24 |
| 4 | 13 | 13.61 | 1.80 | 0.87 | -0.15 |
| 5 | 15 | ∞ | 1.42 | 0.57 | -0.57 |

Single Lens Data

| Lens | First Surface | Focal Length |
|---|---|---|
| 1 | 1 | -6.17 |
| 2 | 3 | 19.27 |
| 3 | 5 | 22.66 |
| 4 | 7 | 6.31 |
| 5 | 9 | -8.68 |
| 6 | 11 | -19.26 |
| 7 | 13 | 13.61 |

Numerical Example 3

Unit: mm

Surface Data

| Surface No. | r | d | nd | vd | Effective diameter |
|---|---|---|---|---|---|
| 1 | 85.616 | 1.05 | 1.86400 | 40.6 | 12.94 |
| 2* | 4.773 | 2.55 | | | 9.55 |
| 3* | 11.026 | 1.50 | 2.14352 | 17.8 | 9.67 |
| 4 | 18.491 | Variable | | | 9.20 |
| 5* | 4.971 | 1.56 | 1.73077 | 40.5 | 4.03 |
| 6 | -27.564 | 0.60 | | | 3.77 |
| 7 | -6.919 | 0.80 | 1.84666 | 23.8 | 3.72 |
| 8 | 16.546 | 0.50 | | | 3.94 |
| 9* | 17.809 | 1.03 | 1.59201 | 67.0 | 4.20 |
| 10 | -6.688 | Variable | | | 4.42 |
| 11* | 7.498 | 1.20 | 1.48749 | 70.2 | 4.83 |
| 12 | -14.988 | 0.50 | 1.69680 | 55.5 | 4.77 |
| 13 | 5.669 | Variable | | | 4.73 |
| 14* | 53.204 | 1.40 | 1.77250 | 49.6 | 8.47 |
| 15 | -15.100 | Variable | | | 8.60 |
| 16 | ∞ | 0.30 | 1.51633 | 64.1 | 15.00 |
| 17 | ∞ | 0.62 | | | 15.00 |
| 18 | ∞ | 0.50 | 1.51633 | 64.1 | 15.00 |
| 19 | ∞ | 0.49 | | | 15.00 |
| Image plane | ∞ | | | | |

Aspheric Coefficients

| | k | B | C |
|---|---|---|---|
| R2 | -8.26055e-01 | 1.82588e-04 | 5.96398e-06 |
| R3 | 1.30285e-01 | 3.38114e-06 | 3.83098e-06 |
| R5 | 7.73111e-01 | -2.76268e-04 | 1.22428e-05 |
| R9 | -5.60947e+01 | -1.47811e-03 | -2.05065e-04 |
| R11 | 0.00000e+00 | -3.92904e-04 | -6.11720e-06 |
| R14 | 0.00000e+00 | -1.39864e-04 | 1.90542e-05 |

| | D | E |
|---|---|---|
| R2 | -4.58739e-08 | 2.97427e-09 |
| R3 | -1.32943e-07 | 3.45521e-09 |
| R5 | 3.40526e-06 | 5.91260e-07 |
| R9 | 9.39321e-06 | -2.22767e-06 |
| R11 | 8.41186e-06 | -1.13159e-06 |
| R14 | -8.68358e-07 | 1.77108e-08 |

Various Data
Zoom Ratio 3.87

| | Wide-Angle End | Middle Focal Length | Telephoto End |
|---|---|---|---|
| Focal Lengths | 3.66 | 8.70 | 14.15 |
| F-number | 2.88 | 4.19 | 5.75 |
| Angle of View | 46.69 | 24.03 | 15.33 |
| Image Height | 3.88 | 3.88 | 3.88 |
| Lens Total Length | 35.11 | 29.26 | 31.81 |
| BF | 0.49 | 0.49 | 0.49 |
| d4 | 15.03 | 3.90 | 1.16 |
| d10 | 1.47 | 3.75 | 5.44 |
| d13 | 1.45 | 4.10 | 8.17 |
| d15 | 2.56 | 2.91 | 2.44 |
| Entrance Pupil Position | 6.05 | 4.14 | 3.21 |
| Exit Pupil Position | -14.22 | -31.10 | -245.35 |
| Front Principal Point Position | 8.80 | 10.45 | 16.55 |

-continued

Unit: mm

| | | | |
|---|---|---|---|
| Rear Principal Point Position | −3.17 | −8.22 | −13.67 |

Various Data of Each Lens Unit

| Lens Unit | First Surface | Focal Length | Lens Config. Length | Front Principal Point Position | Rear Principal Point Position |
|---|---|---|---|---|---|
| 1 | 1 | −9.00 | 5.10 | −0.06 | −3.98 |
| 2 | 5 | 8.19 | 4.49 | 1.03 | −2.69 |
| 3 | 11 | −15.92 | 1.70 | 2.34 | 1.08 |
| 4 | 14 | 15.36 | 1.40 | 0.62 | −0.18 |
| 5 | 16 | ∞ | 1.42 | 0.57 | −0.57 |

Single Lens Data

| Lens | First Surface | Focal Length |
|---|---|---|
| 1 | 1 | −5.89 |
| 2 | 3 | 21.57 |
| 3 | 5 | 5.88 |
| 4 | 7 | −5.67 |
| 5 | 9 | 8.34 |
| 6 | 11 | 10.43 |
| 7 | 12 | −5.85 |
| 8 | 14 | 15.36 |

Numerical Example 4

Unit: mm

Surface Data

| Surface No. | r | d | nd | vd | Effective diameter |
|---|---|---|---|---|---|
| 1 | 99.466 | 1.05 | 1.86400 | 40.6 | 14.39 |
| 2* | 5.440 | 2.88 | | | 10.66 |
| 3* | 14.709 | 1.50 | 2.14352 | 17.8 | 10.70 |
| 4 | 27.425 | Variable | | | 10.28 |
| 5* | 4.618 | 1.56 | 1.73077 | 40.5 | 4.16 |
| 6 | 17.334 | 0.30 | | | 3.78 |
| 7 | 9.369 | 0.80 | 1.84666 | 23.8 | 3.63 |
| 8 | 3.609 | 0.30 | | | 3.23 |
| 9* | 5.716 | 1.03 | 1.59201 | 67.0 | 3.25 |
| 10 | −19.240 | Variable | | | 3.34 |
| 11 | 446.813 | 0.80 | 1.68893 | 31.1 | 4.50 |
| 12* | 10.425 | Variable | | | 4.61 |
| 13* | 26.911 | 1.80 | 1.77250 | 49.6 | 8.79 |
| 14 | −12.058 | 0.60 | 1.69895 | 30.1 | 8.89 |
| 15 | −15.670 | Variable | | | 9.00 |
| 16 | ∞ | 0.30 | 1.51633 | 64.1 | 15.00 |
| 17 | ∞ | 0.62 | | | 15.00 |
| 18 | ∞ | 0.50 | 1.51633 | 64.1 | 15.00 |
| 19 | ∞ | 0.48 | | | 15.00 |
| Image plane | ∞ | | | | |

Aspheric Coefficients

| | k | B | C |
|---|---|---|---|
| R2 | −1.46073e+00 | 5.74124e−04 | 5.48212e−06 |
| R3 | −1.07357e+00 | 8.16609e−05 | 2.25689e−06 |
| R5 | −1.45216e−01 | −4.05052e−04 | −6.18216e−06 |
| R9 | 0.00000e+00 | 1.42078e−04 | 1.50416e−04 |
| R12 | 0.00000e+00 | 7.54748e−04 | −4.37354e−05 |
| R13 | 0.00000e+00 | −5.13982e−05 | 6.60773e−06 |

| | D | E |
|---|---|---|
| R2 | −1.34323e−07 | 3.23343e−09 |
| R3 | −4.23622e−08 | 1.25421e−09 |
| R5 | −2.26778e−06 | 4.37029e−08 |
| R9 | −3.82692e−05 | 7.60454e−06 |
| R12 | 5.48610e−06 | −4.29401e−07 |
| R13 | −3.18319e−07 | 4.87274e−09 |

Various Data
Zoom Ratio 3.81

| | Wide-Angle End | Middle Focal Length | Telephoto End |
|---|---|---|---|
| Focal Lengths | 3.71 | 8.98 | 14.13 |
| F-number | 2.88 | 4.28 | 5.77 |
| Angle of View | 46.30 | 23.36 | 15.36 |
| Image Height | 3.88 | 3.88 | 3.88 |
| Lens Total Length | 38.00 | 30.32 | 33.00 |
| BF | 0.48 | 0.48 | 0.48 |
| d4 | 17.38 | 3.96 | 0.90 |
| d10 | 2.00 | 3.94 | 6.10 |
| d12 | 1.50 | 3.83 | 7.24 |
| d15 | 2.60 | 4.06 | 4.24 |
| Entrance Pupil Position | 6.70 | 4.41 | 3.34 |
| Exit Pupil Position | −16.30 | −42.52 | 178.00 |
| Front Principal Point Position | 9.59 | 11.52 | 18.59 |
| Rear Principal Point Position | −3.22 | −8.50 | −13.64 |

Various Data of Each Lens Unit

| Lens Unit | First Surface | Focal Length | Lens Config. Length | Front Principal Point Position | Rear Principal Point Position |
|---|---|---|---|---|---|
| 1 | 1 | −10.09 | 5.43 | −0.21 | −4.56 |
| 2 | 5 | 8.36 | 3.99 | −0.13 | −2.81 |
| 3 | 11 | −15.50 | 0.80 | 0.49 | 0.01 |
| 4 | 13 | 12.92 | 2.40 | 0.87 | −0.53 |
| 5 | 16 | ∞ | 1.42 | 0.57 | −0.57 |

Single Lens Data

| Lens | First Surface | Focal Length |
|---|---|---|
| 1 | 1 | −6.70 |
| 2 | 3 | 26.10 |
| 3 | 5 | 8.19 |
| 4 | 7 | −7.41 |
| 5 | 9 | 7.56 |
| 6 | 11 | −15.50 |
| 7 | 13 | 11.00 |
| 8 | 14 | −80.33 |

Numerical Example 5

Unit: mm

Surface Data

| Surface No. | r | d | nd | vd | Effective diameter |
|---|---|---|---|---|---|
| 1 | −276.801 | 1.20 | 1.86400 | 40.6 | 14.96 |
| 2* | 5.484 | 2.94 | | | 11.31 |
| 3* | 16.985 | 1.50 | 2.10200 | 16.8 | 11.64 |
| 4 | 41.788 | Variable | | | 11.40 |
| 5* | 6.536 | 1.60 | 1.81000 | 41.0 | 5.00 |
| 6 | 1823.882 | 0.20 | | | 4.80 |
| 7 | 7.326 | 1.20 | 1.49700 | 81.5 | 4.61 |
| 8 | −86.233 | 0.50 | 1.76182 | 26.5 | 4.26 |
| 9 | 4.449 | 0.80 | | | 3.91 |
| 10 (Stop) | ∞ | 0.30 | | | 3.94 |
| 11 | 9.843 | 1.03 | 1.56907 | 71.3 | 3.99 |
| 12 | −27.708 | Variable | | | 3.92 |
| 13* | −14.320 | 0.80 | 1.81474 | 37.0 | 4.73 |
| 14* | −180.294 | Variable | | | 4.87 |
| 15 | −152.946 | 2.00 | 1.77250 | 49.6 | 9.47 |
| 16* | −9.153 | Variable | | | 9.71 |
| 17 | ∞ | 0.30 | 1.51633 | 64.1 | 15.00 |
| 18 | ∞ | 0.62 | | | 15.00 |
| 19 | ∞ | 0.50 | 1.51633 | 64.1 | 15.00 |
| 20 | ∞ | 0.40 | | | 15.00 |
| Image plane | ∞ | | | | |

Aspheric Coefficients

| | k | B | C |
|---|---|---|---|
| R2 | −8.79861e−01 | −2.66722e−05 | 3.15717e−07 |
| R3 | −1.92426e+00 | 8.33093e−05 | 3.80152e−07 |
| R5 | −3.13802e−01 | −1.61589e−04 | −1.76830e−07 |
| R13 | 0.00000e+00 | 2.78975e−03 | 9.63653e−07 |
| R14 | 0.00000e+00 | 3.51146e−03 | −8.39532e−06 |
| R16 | 0.00000e+00 | 2.97798e−04 | −1.39036e−05 |

| | D | E |
|---|---|---|
| R2 | 1.73212e−07 | −2.50519e−09 |
| R3 | 3.87320e−08 | −2.52980e−10 |
| R5 | −8.61130e−08 | −4.02232e−09 |
| R13 | −2.59843e−05 | 1.65213e−06 |
| R14 | −1.57164e−05 | 7.66379e−07 |
| R16 | 5.88967e−07 | −8.77916e−09 |

Various Data
Zoom Ratio 4.76

| | Wide-Angle End | Middle Focal Length | Telephoto End |
|---|---|---|---|
| Focal Lengths | 3.71 | 9.93 | 17.66 |
| F-number | 2.88 | 4.42 | 5.96 |
| Angle of View | 46.30 | 21.35 | 12.39 |
| Image Height | 3.88 | 3.88 | 3.88 |
| Lens Total Length | 39.81 | 33.12 | 37.26 |
| BF | 0.40 | 0.40 | 0.40 |
| d4 | 17.64 | 3.86 | 0.90 |
| d12 | 2.00 | 5.60 | 8.88 |
| d14 | 1.60 | 4.59 | 9.37 |
| d16 | 2.68 | 3.19 | 2.22 |
| Entrance Pupil Position | 6.76 | 5.33 | 4.77 |
| Exit Pupil Position | −14.64 | −104.99 | 40.56 |
| Front Principal Point Position | 9.55 | 14.32 | 30.20 |
| Rear Principal Point Position | −3.31 | −9.53 | −17.27 |

Various Data of Each Lens Unit

| Lens Unit | First Surface | Focal Length | Lens Config. Length | Front Principal Point Position | Rear Principal Point Position |
|---|---|---|---|---|---|
| 1 | 1 | −9.49 | 5.64 | −0.30 | −4.95 |
| 2 | 5 | 9.01 | 5.63 | −0.01 | −4.23 |
| 3 | 13 | −19.13 | 0.80 | −0.04 | −0.48 |
| 4 | 15 | 12.53 | 2.00 | 1.19 | 0.07 |
| 5 | 17 | ∞ | 1.42 | 0.57 | −0.57 |

Single Lens Data

| Lens | First Surface | Focal Length |
|---|---|---|
| 1 | 1 | −6.21 |
| 2 | 3 | 25.17 |
| 3 | 5 | 8.10 |
| 4 | 7 | 13.65 |
| 5 | 8 | −5.54 |
| 6 | 11 | 12.89 |
| 7 | 13 | −19.13 |
| 8 | 15 | 12.53 |

Numerical Example 6

Unit: mm

Surface Data

| Surface No. | r | d | nd | vd | Effective diameter |
|---|---|---|---|---|---|
| 1 | 51.394 | 1.05 | 1.85135 | 40.1 | 12.63 |
| 2* | 4.094 | 2.54 | | | 8.97 |
| 3* | 9.278 | 1.50 | 2.10225 | 16.8 | 9.22 |
| 4 | 15.369 | Variable | | | 8.75 |
| 5* | 5.183 | 1.56 | 1.77250 | 49.6 | 3.62 |
| 6 | −48.494 | 0.59 | | | 3.33 |
| 7 | −8.455 | 0.80 | 1.84666 | 23.8 | 3.10 |
| 8 | 25.169 | 0.39 | | | 3.02 |
| 9 (Stop) | ∞ | 0.55 | | | 3.00 |
| 10* | 27.384 | 1.03 | 1.59201 | 67.0 | 2.97 |
| 11 | −5.657 | Variable | | | 3.03 |
| 12 | −59.185 | 0.80 | 1.80610 | 33.3 | 3.58 |
| 13 | 18.613 | Variable | | | 3.81 |
| 14* | 18.104 | 1.40 | 1.77250 | 49.6 | 7.43 |
| 15 | −339.826 | Variable | | | 7.52 |
| 16 | ∞ | 0.30 | 1.51633 | 64.1 | 15.00 |
| 17 | ∞ | 0.62 | | | 15.00 |
| 18 | ∞ | 0.50 | 1.51633 | 64.1 | 15.00 |
| 19 | ∞ | | | | 15.00 |
| Image plane | ∞ | | | | |

Aspheric Coefficients

| | | | |
|---|---|---|---|
| R2 | k = −1.01307e+000 | B = 4.85825e−004 | C = 2.68253e−005 |
| | D = −6.35527e−007 | E = 2.01839e−008 | |
| R3 | k = −1.57465e+000 | B = 2.33602e−004 | C = 9.23122e−006 |
| | D = −2.90186e−007 | E = 9.28177e−009 | |
| R5 | k = 5.03122e−002 | B = 4.30955e−005 | C = 5.48347e−005 |
| | D = −1.12554e−005 | E = 1.40193e−006 | |

-continued

Unit: mm

| | | | |
|---|---|---|---|
| R10 | k = −1.18768e+002 | B = −2.35528e−003 | C = −1.62517e−004 |
| | D = 1.81037e−005 | E = −2.22752e−006 | |
| R14 | k = 0.00000e+000 | B = −1.92426e−004 | C = 9.89324e−006 |
| | D = −4.66859e−007 | E = 1.24270e−008 | |

Various Data
Zoom Ratio 2.93

| | Wide-Angle End | Middle Focal Length | Telephoto End |
|---|---|---|---|
| Focal Lengths | 3.65 | 7.33 | 10.70 |
| F-number | 2.88 | 4.14 | 5.36 |
| Angle of View | 46.75 | 27.90 | 19.93 |
| Image Height | 3.88 | 3.88 | 3.88 |
| Lens Total Length | 30.49 | 27.04 | 29.15 |
| BF | 0.49 | 0.49 | 0.49 |
| d4 | 10.97 | 3.20 | 0.98 |
| d11 | 1.21 | 1.83 | 1.86 |
| d13 | 1.22 | 4.93 | 9.22 |
| d15 | 2.97 | 2.97 | 2.97 |
| d19 | 0.49 | 0.49 | 0.49 |
| Entrance Pupil Position | 5.65 | 4.60 | 4.11 |
| Exit Pupil Position | −9.55 | −17.39 | −32.50 |
| Front Principal Point Position | 7.98 | 8.92 | 11.34 |
| Rear Principal Point Position | −3.16 | −6.84 | −10.21 |

Various Data of Each Lens Unit

| Lens Unit | First Surface | Focal Length | Lens Config. Length | Front Principal Point Position | Rear Principal Point Position |
|---|---|---|---|---|---|
| 1 | 1 | −8.27 | 5.09 | −0.05 | −3.99 |
| 2 | 5 | 7.08 | 4.92 | 1.89 | −2.63 |
| 3 | 12 | −17.49 | 0.80 | 0.34 | −0.11 |
| 4 | 14 | 22.29 | 1.40 | 0.04 | −0.75 |
| 5 | 16 | ∞ | 1.42 | 0.57 | −0.57 |

Single Lens Data

| Lens | First Surface | Focal Length |
|---|---|---|
| 1 | 1 | −5.28 |
| 2 | 3 | 18.81 |
| 3 | 5 | 6.14 |
| 4 | 7 | −7.39 |
| 5 | 10 | 8.01 |
| 6 | 12 | −17.49 |
| 7 | 14 | 22.29 |
| 8 | 16 | 0.00 |
| 9 | 18 | 0.00 |

TABLE 1

| | | | Numerical Example | | | | | |
|---|---|---|---|---|---|---|---|---|
| Condition | LLV | ULV | 1 | 2 | 3 | 4 | 5 | 6 |
| (1) | 0.30 | 0.68 | 0.62 | 0.62 | 0.58 | 0.57 | 0.50 | 0.47 |
| (2) | 10.0 | 23.0 | 16.8 | 21.5 | 17.8 | 17.8 | 16.8 | 16.8 |
| (3) | 2.1 | 5.0 | 3.01 | 2.47 | 2.73 | 3.22 | 2.70 | 3.01 |
| (4) | 3.7 | 6.5 | 4.02 | 4.68 | 4.35 | 4.18 | 5.16 | 4.79 |
| (5) | 0.2 | 0.9 | 0.55 | 0.28 | 0.27 | 0.33 | 0.23 | 0.65 |
| (6) | 1.9 | 3.0 | 2.50 | 2.71 | 2.46 | 2.72 | 2.56 | 2.27 |
| (7) | 1.5 | 3.0 | 2.08 | 2.15 | 2.24 | 2.26 | 2.43 | 1.94 |

Note:
In Table 1, "LLV" indicates the lower limit value and "ULV" indicates the upper limit value.

Now, an exemplary embodiment of a digital camera that uses the zoom lens according to each exemplary embodiment of the present invention as a photographic optical system will be described below with reference to FIG. 13.

Referring to FIG. 13, a digital camera body 20 includes a photographic optical system 21, which is constituted by the zoom lens according to any of the above-described exemplary embodiments of the present invention. In addition, the digital camera body 20 includes an image sensor 22, such as a CCD sensor or a CMOS sensor. The image sensor 22 receives an object image formed by the photographic optical system 21.

A recording unit 23 records the object image received by the image sensor 22. The photographer can observe the object image displayed by a display device (not illustrated) via a viewfinder 24. The display device is constituted by a liquid crystal display (LCD) panel. The display device displays the object image formed on the image sensor 22.

By applying the zoom lens according to each exemplary embodiment of the present invention to an optical apparatus, such as a digital camera, the present invention can implement an image pickup apparatus having a high optical performance.

When the zoom lens according to an exemplary embodiment of the present invention is used in an optical apparatus that uses a photoelectric conversion element, distortion can be corrected by using a known method.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-159295 filed Jul. 14, 2010, which is hereby incorporated by reference herein in its entirety.

What is claimed is:

1. A zoom lens, in order from an object side to an image side thereof, comprising:
a first lens unit having a negative refractive power;
a second lens unit having a positive refractive power;
a third lens unit having a negative refractive power;
and a fourth lens unit having a positive refractive power,
wherein a distance between consecutive lens units of the first through fourth lens units varies for zooming,
wherein the first lens unit includes, in order from the object side to the image side, a negative lens and a positive lens whose surface on the object side has a convex shape, and
wherein, when fw is a focal length of the entire zoom lens at a wide-angle end of the zoom lens, f1 is a focal length of the first lens unit, f3 is a focal length of the third lens unit, $\nu d1p$ is an Abbe number of a material of the positive lens of the first lens unit, f3$i$ is a focal length in air of an i-th single lens counted from the object side included in the third lens unit, $\nu d3i$ is an Abbe number of the material of the i-th single lens counted from the object side included in the third lens unit, and $\Sigma$ is a sum with respect to the focal lengths f3$i$ and the Abbe numbers vd3$i$ of all single lenses included in the third lens unit, the following conditions are satisfied:

$$0.30 < f1/f3 < 0.68$$

$$10.0 < vd1p < 23.0$$

$$2.1 < f3 \times \Sigma(100/(f3i \times vd3i)) < 5.0,$$

$$3.7 < |f3/fw| < 6.5,$$

where i is an integer equal to or greater than 1.

2. The zoom lens according to claim 1, wherein, when D23$w$ is an interval between the second lens unit and the third lens unit at a wide-angle end of the zoom lens, D23$t$ is a distance between the second lens unit and the third lens unit at a telephoto end of the zoom lens, the following condition is satisfied:

$$0.2 < D23w/D23t < 0.9.$$

3. The zoom lens according to claim 1, wherein, when fw is a focal length of the entire zoom lens at a wide-angle end of the zoom lens and f1 is a focal length of the first lens unit, the following condition is satisfied:

$$1.9 < |f1/fw| < 3.0.$$

4. The zoom lens according to claim 1, wherein, when fw is a focal length of the entire zoom lens at a wide-angle end of the zoom lens and f2 is a focal length of the second lens unit, the following condition is satisfied:

$$1.5 < |f2/fw| < 3.0.$$

5. The zoom lens according to claim 1, wherein the third lens unit includes one lens component.

6. The zoom lens according to claim 1, wherein the fourth lens unit includes one lens component.

7. The zoom lens according to claim 1, wherein, during zooming from a wide-angle end to a telephoto end, the first lens unit moves along a part of a locus convex towards the image side, the second lens unit and the third lens unit move towards the object side independently from each other, and the fourth lens unit moves towards the image side or towards the object side, or moves along a locus convex towards the object side.

8. The zoom lens according to claim 1, wherein the zoom lens is configured to form an image on a photoelectric conversion element or a film placed at an image plane of the zoom lens.

9. An image pickup apparatus comprising:
a zoom lens; and
a photoelectric conversion element configured to receive an image formed by the zoom lens,
wherein the zoom lens comprises:
a first lens unit having a negative refractive power;
a second lens unit having a positive refractive power;
a third lens unit having a negative refractive power;
and a fourth lens unit having a positive refractive power,
wherein a distance between consecutive lens units of the first through fourth lens units varies for zooming,
wherein the first lens unit includes, in order from the object side to the image side, a negative lens and a positive lens whose surface on the object side has a convex shape, and
wherein, when fw is a focal length of the entire zoom lens at a wide-angel end of the zoom lens, f1 is a focal length of the first lens unit, f3 is a focal length of the third lens unit, vd1$p$ is an Abbe number of a material of the positive lens of the first lens unit, f3$i$ is a focal length in air of an i-th single lens counted from the object side included in the third lens unit, vd3$i$ is an Abbe number of the material of the i-th single lens counted from the object side included in the third lens unit, and $\Sigma$ is a sum with respect to the focal lengths f3$i$ and the Abbe numbers vd3$i$ of all single lenses included in the third lens unit, the following conditions are satisfied:

$$0.30 < f1/f3 < 0.68$$

$$10.0 < vd1p < 23.0$$

$$2.1 < f3 \times \Sigma(100/(f3i \times vd3i)) < 5.0,$$

$$3.7 < |f3/fwl| < 6.5,$$

where i is an integer equal to or greater than 1.

* * * * *